(12) United States Patent
Takahashi et al.

(10) Patent No.: US 11,075,067 B2
(45) Date of Patent: Jul. 27, 2021

(54) ION ANALYSIS DEVICE AND ION DISSOCIATION METHOD

(71) Applicant: Shimadzu Corporation, Kyoto (JP)

(72) Inventors: Hidenori Takahashi, Kyoto (JP); Shosei Yamauchi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/604,036

(22) PCT Filed: Feb. 27, 2018

(86) PCT No.: PCT/JP2018/007346
§ 371 (c)(1),
(2) Date: Oct. 9, 2019

(87) PCT Pub. No.: WO2018/190013
PCT Pub. Date: Oct. 18, 2018

(65) Prior Publication Data
US 2020/0035478 A1    Jan. 30, 2020

(30) Foreign Application Priority Data

Apr. 10, 2017 (JP) .............................. JP2017-077747

(51) Int. Cl.
*H01J 49/10* (2006.01)
*H01J 49/42* (2006.01)
(Continued)

(52) U.S. Cl.
CPC ........ *H01J 49/105* (2013.01); *H01J 49/0054* (2013.01); *H01J 49/147* (2013.01); *H01J 49/424* (2013.01); *H01J 49/4225* (2013.01)

(58) Field of Classification Search
CPC .. H01J 49/004; H01J 49/0054; H01J 49/0072; H01J 49/105; H01J 49/147; H01J 49/4225; H01J 49/424
See application file for complete search history.

(56) References Cited

U.S. PATENT DOCUMENTS

| 6,511,575 B1* | 1/2003 | Shindo ................. B08B 7/0035 |
| | | 204/298.34 |
| 2003/0183760 A1* | 10/2003 | Tsybin ................. H01J 49/0059 |
| | | 250/292 |

(Continued)

FOREIGN PATENT DOCUMENTS

| CA | 2 560 753 A1 | 10/2005 |
| CN | 106104747 A | 11/2016 |

(Continued)

OTHER PUBLICATIONS

Partial Supplementary European Search Report dated Mar. 5, 2020, in Patent Application No. 18784512.8, 19 pages.

(Continued)

*Primary Examiner* — David E Smith
(74) *Attorney, Agent, or Firm* — Oblon, McClelland, Maier & Neustadt, L.L.P.

(57) ABSTRACT

After a precursor ion has been captured within an ion trap (2), electrons having a high energy equal to or higher than 30 eV are introduced from an electron irradiator (7) into the ion trap (2) to increase the number of charges of the ion through an interaction between the electrons and the ion. Hydrogen radicals are subsequently introduced from a hydrogen radical irradiator (5) into the ion trap (2) to dissociate the ion by a hydrogen-attachment dissociation (HAD) method. The larger the number of charges of the ion is, the higher the dissociation efficiency by the HAD method becomes. Therefore, for example, even in the case of using an ion source in which most of the generated ions are singly charged ions as in a MALDI ion source, the dissociation efficiency can be improved by increasing the number of charges of the precursor ion within the ion trap (2).

20 Claims, 10 Drawing Sheets

(51) Int. Cl.
      *H01J 49/14* (2006.01)
      *H01J 49/00* (2006.01)

(56) References Cited

U.S. PATENT DOCUMENTS

| | | | |
|---|---|---|---|
| 2005/0023454 A1* | 2/2005 | Bateman | H01J 49/0036 250/288 |
| 2005/0178955 A1* | 8/2005 | Baba | H01J 49/4225 250/281 |
| 2006/0192100 A1* | 8/2006 | Zubarev | H01J 49/005 250/282 |
| 2007/0138386 A1* | 6/2007 | Makarov | H01J 49/0054 250/288 |
| 2008/0035841 A1* | 2/2008 | Ding | H01J 49/0054 250/283 |
| 2009/0283675 A1* | 11/2009 | Franzen | H01J 49/0072 250/288 |
| 2011/0121174 A1* | 5/2011 | Yoshioka | H01J 49/0054 250/283 |
| 2014/0249766 A1 | 9/2014 | Kozawa et al. | |
| 2016/0372311 A1 | 12/2016 | Takahashi et al. | |
| 2017/0117124 A1* | 4/2017 | Baba | H01J 49/0054 |
| 2017/0221694 A1 | 8/2017 | Papanastasiou et al. | |

FOREIGN PATENT DOCUMENTS

| | | |
|---|---|---|
| DE | 11 2005 000 720 B4 | 11/2013 |
| EP | 3 093 871 A1 | 11/2016 |
| GB | 2 414 855 A | 12/2005 |
| GB | 2 427 069 A | 12/2006 |
| WO | WO 2005/096342 A2 | 10/2005 |
| WO | WO 2005/096342 A3 | 10/2005 |
| WO | WO 2013/051148 A1 | 4/2013 |
| WO | WO 2015/133259 A1 | 9/2015 |
| WO | WO-2015133259 A1 * | 9/2015 ......... H01J 49/0072 |

OTHER PUBLICATIONS

Plamen A. Demirev, "Generation of hydrogen radicals for reactivity studies in Fourier transform ion cyclotron resonance mass spectrometry", Rapid Communications in Mass Spectrometry., vol. 14, No. 9, May 15, 2000, pp. 777-781, XP055321772, GB, ISSN: 0951-4198.
English translation of Written Opinion dated Jan. 5, 2018 in PCT/JP2018/007346, 14 pages.
Office Action dated Aug. 11, 2020 in corresponding Japanese Patent Application No. 2019-512371 (with English Translation), 10 pages.
International Search Report dated May 1, 2018 in PCT/JP2018/007346 filed on Feb. 27, 2018.
Written Opinion dated Feb. 27, 2018 in PCT/JP2018/007346 filed on Feb. 27, 2018 (with partial English translation).
Takahashi, H. et al., "Hydrogen Attachment/Abstraction Dissociation (HAD) of Gas-Phase Peptide Ions for Tandem Mass Spectrometry", Analytical Chemistry, 2016, vol. 88, No. 7, pp. 3810-3816.
Zubarev, R. A. et al., "Electron Capture Dissociation for Structural Characterization of Multiply Charged Protein Cations", Analytical Chemistry, 2000, vol. 72, No. 3, pp. 563-573.
Budnik, B. A. et al., "$MH^{2+}$ ion production from protonated polypeptides by electron impact: observation and determination of ionization energies and a cross-section", Chemical Physics Letters, 2000, vol. 316, No. 1, pp. 19-23.
Fung, Y. M. E. et al., "Electron Ionization Dissociation of Singly and Multiply Charged Peptides", Journal of the American Chemical Society, 2009, vol. 131, No. 29, pp. 9977-9985.
Rapp, D. et al., "Cross Sections for Dissociative Ionization of Molecules by Electron Impact", The Journal of Chemical Physics, 1965, vol. 42, pp. 4081-4085.
Breuker, K. et al., "Detailed Unfolding and Folding of Gaseous Ubiquitin Ions Characterized by Electron Capture Dissociation", Journal of the American Chemical Society, 2002, vol. 124, No. 22, pp. 6407-6420.
Koncz, Cs. et al., "Calculated cross sections for the single ionization of fullerenes by electron impact", Nuclear Instruments and Methods in Physics Research B, 1997, vol. 124, No. 2, pp. 435-437.
Di Stefano, L. H. et al., "Size-Dependent Hydrogen Atom Attachment to Gas-Phase Hydrogen-Deficient Polypeptide Radical Cations", Journal of the American Chemical Society, 2018, vol. 140, No. 2, 3 total pages.
McLuckey, S. A. et al., "Principles of Collisional Activation in Analytical Mass Spectrometry", Journal of the American Society for Mass Spectrometry, 1992, vol. 3, pp. 599-614.
Syka, J. E. P. et al., "Peptide and protein sequence analysis by electron transfer dissociation mass spectrometry", Proceedings of the National Academy of Sciences of United States of America, 2004, vol. 101, No. 26, pp. 9528-9533.
Zubarev, R. A. et al., "Electron Capture Dissociation of Multiply Charged Protein Cations. A Nonergodic Process", Journal of the American Chemical Society, 1998, vol. 120, No. 13, pp. 3265-3266.
Ding, L. et al., "Electron Capture Dissociation in a Digital Ion Trap Mass Spectrometer", Analytical Chemistry, 2006, vol. 78, No. 6, pp. 1995-2000.

* cited by examiner

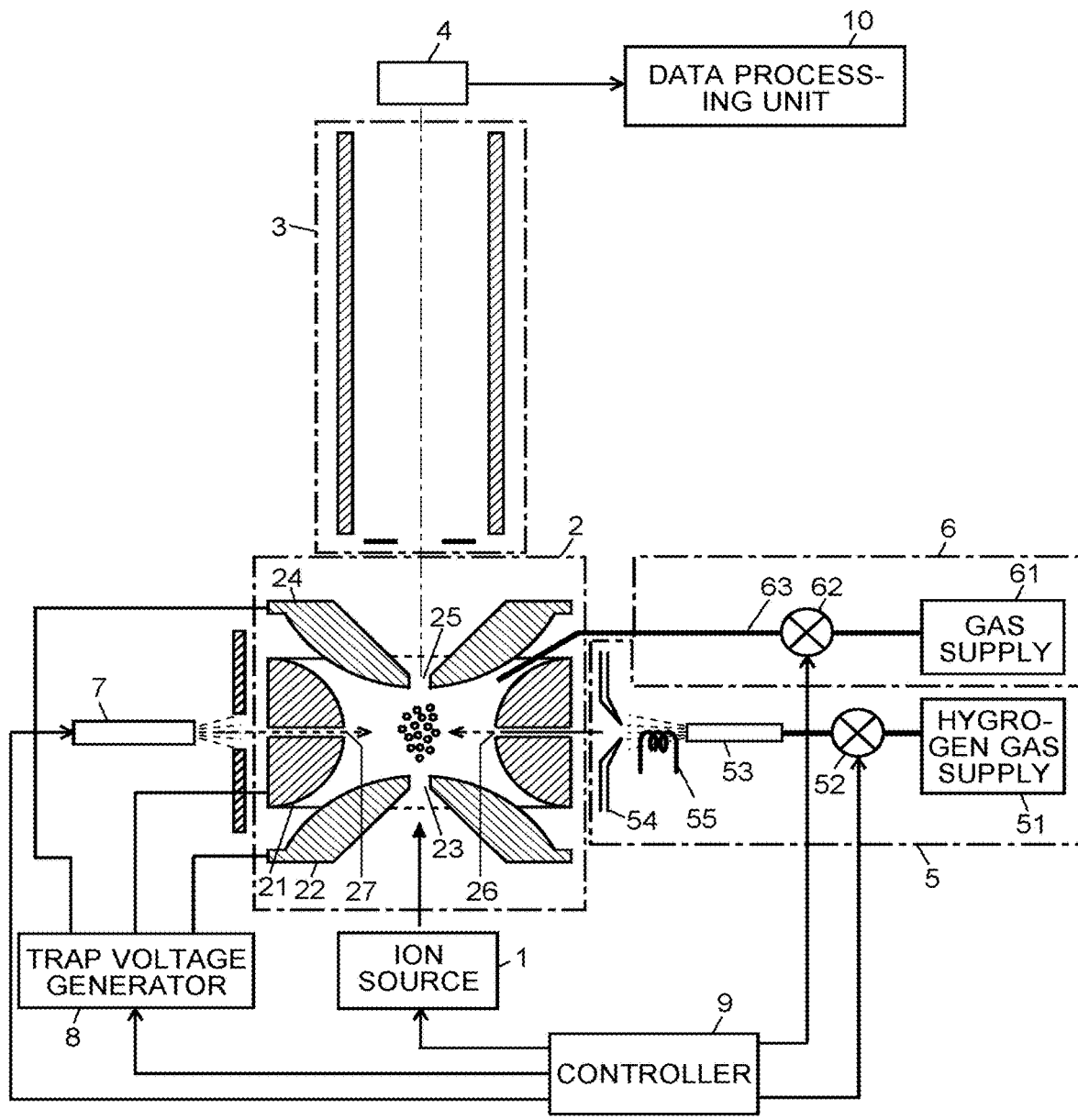
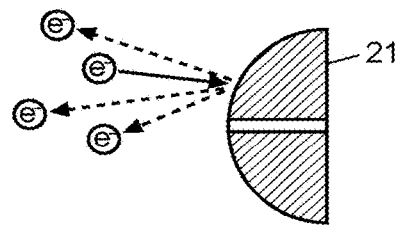

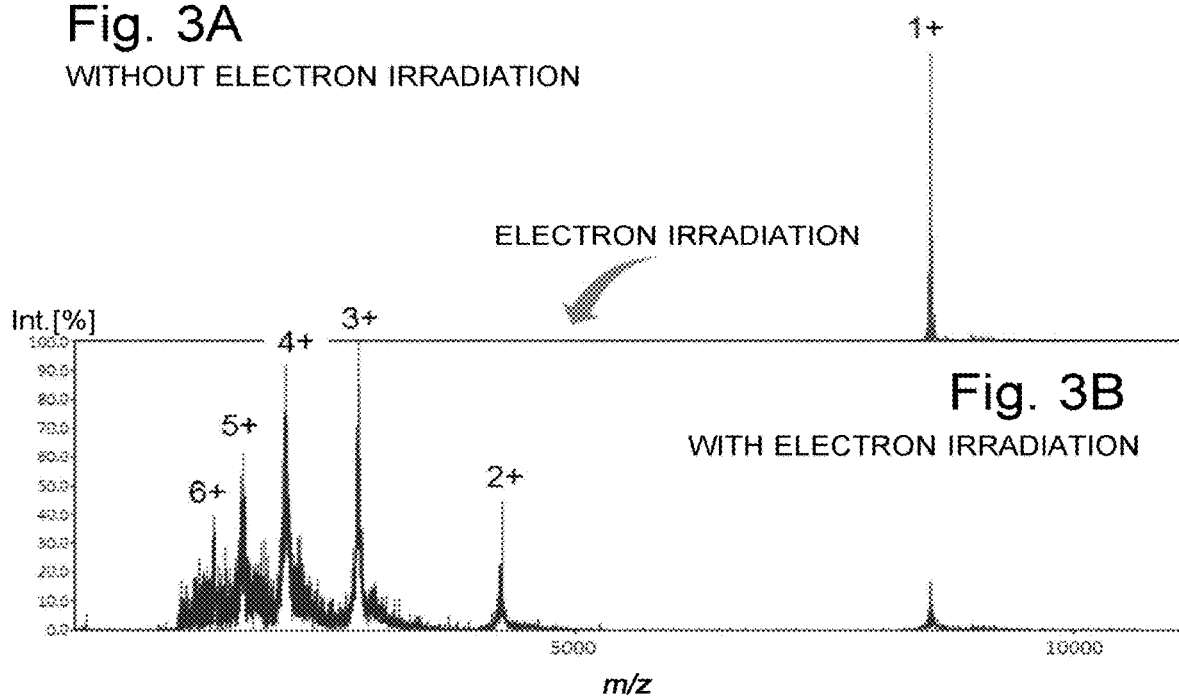
Fig. 3A WITHOUT ELECTRON IRRADIATION
Fig. 3B WITH ELECTRON IRRADIATION
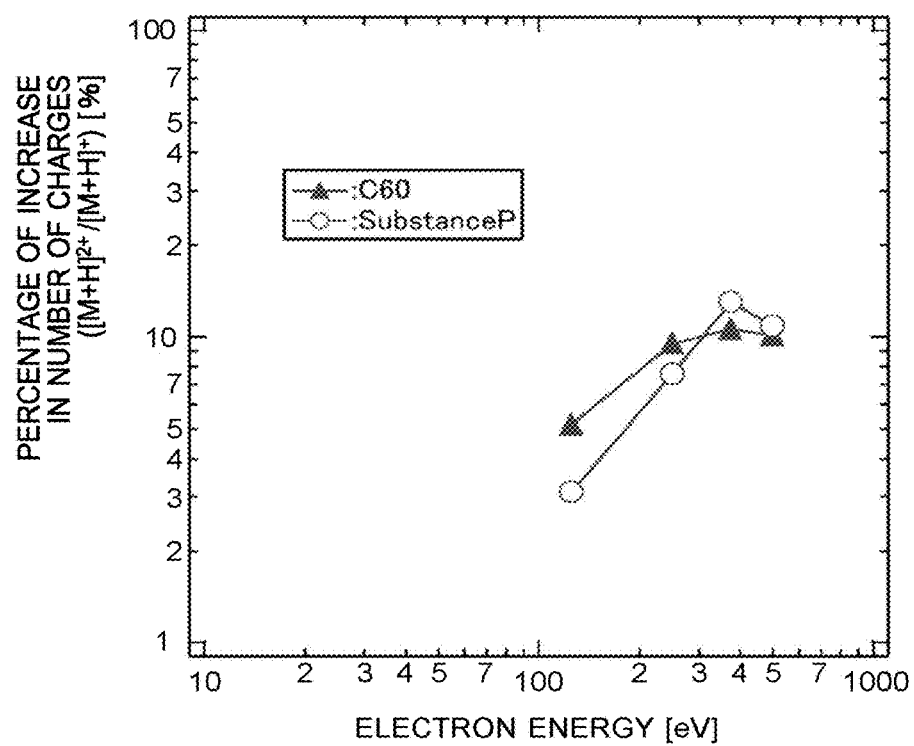
Fig. 4

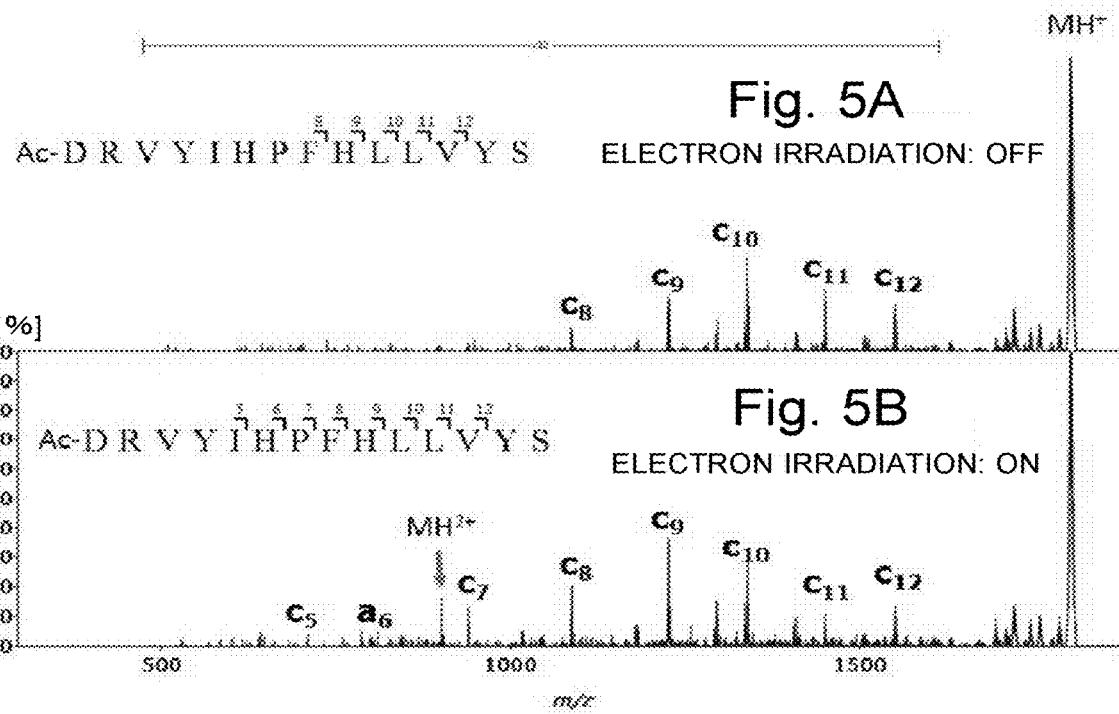
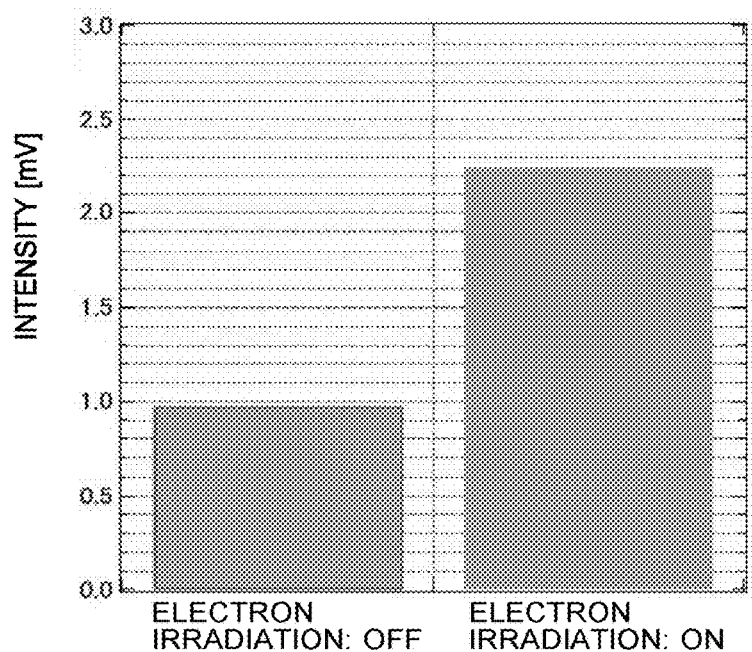

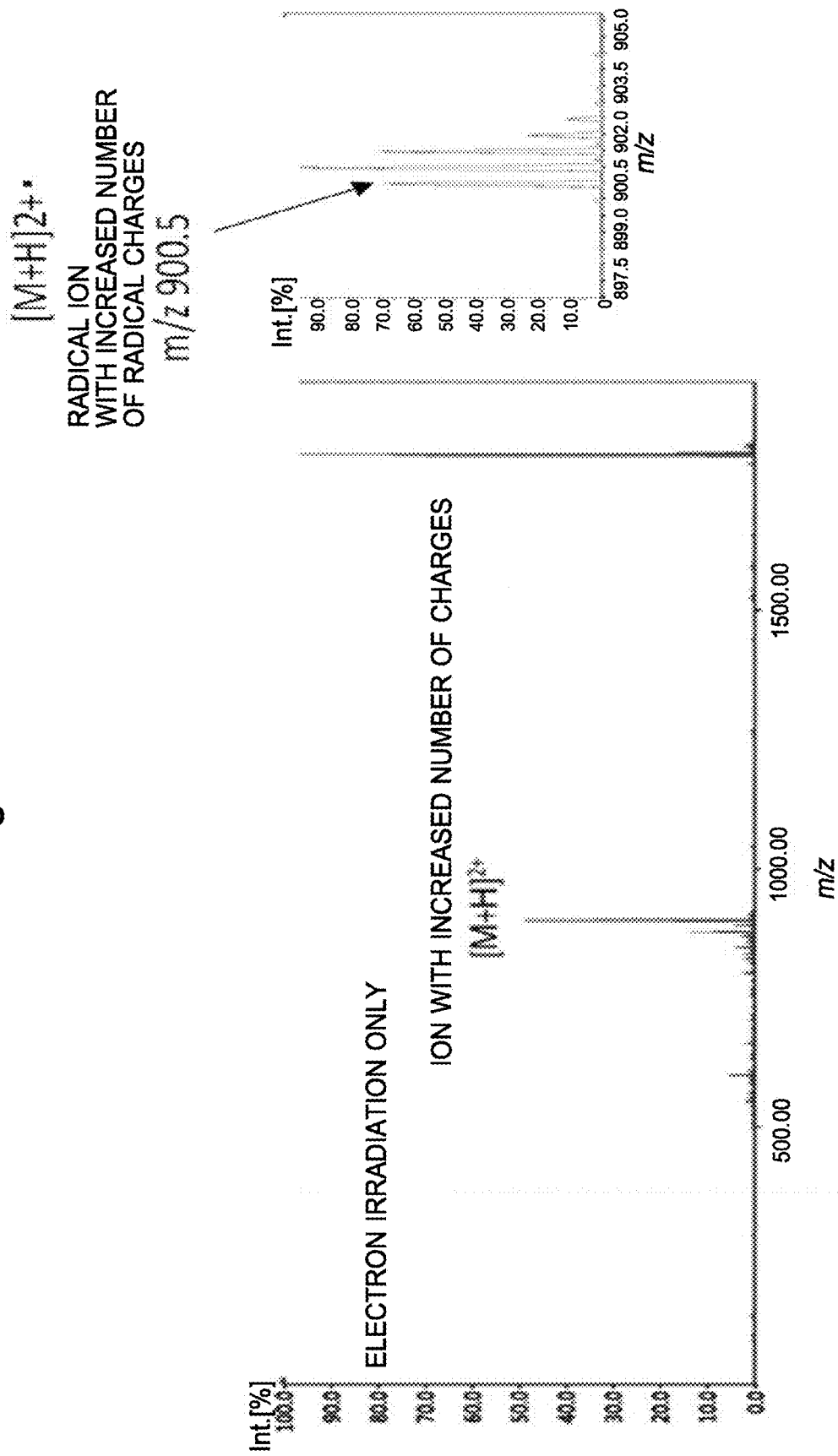

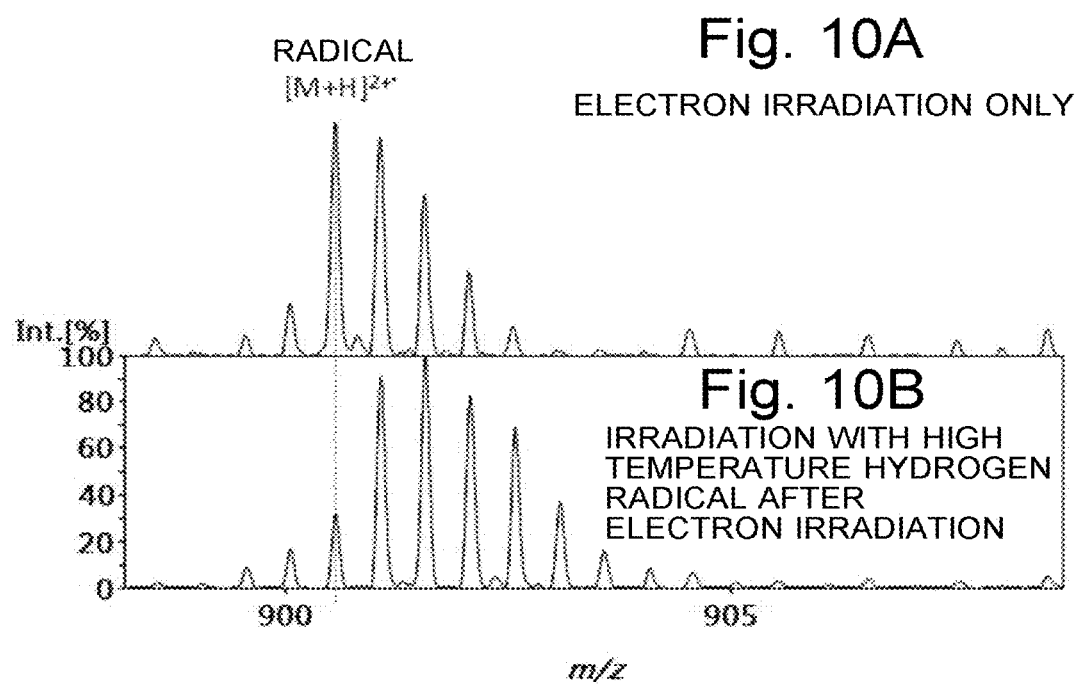

Fig. 14A LASER INTENSITY: LOW
Fig. 14B LASER INTENSITY: OPTIMUM
Fig. 14C LASER INTENSITY: HIGH

ION ANALYSIS DEVICE AND ION DISSOCIATION METHOD

TECHNICAL FIELD

The present invention relates to an ion analyzer as well as an ion dissociation method for such an ion analyzer in which an ion derived from a sample component is captured within an ion trap, the captured ion is dissociated in one or more stages, and ions produced by the dissociation are analyzed. The "ion analyzer" in the present context includes a mass spectrometer which detects ions after separating the ions according to their mass-to-charge ratios by the ion trap itself or by an external ion separator, as well as an ion mobility spectrometer which detects ions after separating the ions according to their mobilities by an external ion mobility meter.

BACKGROUND ART

For the identification and/or structural analysis of a high-molecular compound, in recent years, a mass spectrometric method has been used which includes the steps of capturing an ion derived from a target compound within an ion trap, dissociating the captured ion in one or more stages, separating the resulting product ions (fragment ions) according to their mass-to-charge ratios, and detecting the separated ions. Commonly known devices for such mass spectrometry include an ion trap mass spectrometer in which the mass spectrometry is performed by the ion trap itself, as well as an ion trap time-of-flight mass spectrometer in which product ions are ejected from the ion trap and subjected to mass spectrometry in an external time-of-flight mass analyzer.

The most commonly used technique for dissociating an ion having a high-molecular weight in such a mass spectrometer is the collision induced dissociation (CID) method which induces the dissociation of an ion by resonantly oscillating the ion by the effect of an electric field to make the ion collide with argon or similar gas. There are various other methods which are also commonly known, such as the infrared multi-photon dissociation (IRMPD), ultraviolet photo dissociation (UVPD), electron transfer dissociation (ETD), and electron capture dissociation (ECD).

The ETD and ECD methods are popularly used for the dissociation of ions of high-molecular compounds derived from biological samples, such as proteins or peptides.

In the ETD method, a negative molecular ion is injected into an ion trap as a reaction ion. Within the ion trap, this ion is made to collide and interact with an ion derived from a sample component. Due to this interaction, an electron is transferred from the reaction ion to a proton in the ion derived from the sample component, whereby the proton is changed into hydrogen radical. The radical species of the ion generated by this reaction dissociates in a bond-specific way. On the other hand, in the ECD method, an electron having a low energy of approximately 1 eV is injected into the ion trap. Within the ion trap, this electron is made to be added to a proton in an ion derived from a sample component. The proton is consequently changed into hydrogen radical. The radical species of the ion generated by this reaction dissociates in a bond-specific way.

Unlike the collision induced dissociation or similar collision-based method, the ETD and ECD methods are radical-induced dissociation methods, so that a fragmentation of the N-Cα bond in the peptide backbone specifically occurs. Therefore, c/z-type fragment ions, which cannot be easily produced by the CID method, are abundantly produced. Since modified sites, such as glycans, are retained in the dissociation process, it is easy to identify the modifier or locate the modified site. Due to such features, the ETD and ECD methods are useful for an exhaustive analysis of biopolymer compounds.

The present inventors have developed a hydrogen-attachment dissociation method (which is hereinafter abbreviated as the "HAD" method) as a novel ion dissociation method, and have proposed the method in Patent Literature 1, Non-Patent Literature 1 and other related documents. Simply put, the HAD method is a method which induces the dissociation of an ion by attaching hydrogen radical (=hydrogen atom) to the ion. Its dissociation mechanism is considered to be similar to the ECD and ETD methods. That is to say, the HAD method is also a type of radical-induced ion-dissociation method, and therefore, has the same advantage as the ETD and ECD methods.

As noted earlier, the ETD and ECD methods have advantageous features for the structural analysis of biopolymer compounds. However, those techniques are theoretically capable of only dissociating multiply charged ions whose number of charges is equal to or greater than two, since singly charged ions derived from sample components are immediately neutralized after the reaction with the radical. It has also been known that those techniques cannot exhibit a high level of dissociation efficiency for an ion whose number of charges is comparatively low (roughly, equal to or less than six) even when the number of charges is equal to or greater than two. A sufficient amount of information for the structural analysis cannot be obtained for such ions.

By comparison, hydrogen radicals used in the HAD method are neutral and do not decrease the number of charges of the molecular ion in the dissociation process. Therefore, this technique is theoretically applicable to all kinds of ions, including singly charged ions. In practice, however, the dissociation efficiency in the HAD method also increases with an increase in the number of charges of the precursor ion, and it is difficult to obtain a sufficient amount of information for the structural analysis if the number of charges of the precursor ion is low.

FIG. 12 shows an MS/MS spectrum (product ion spectrum) acquired by performing dissociation by a HAD method using a singly charged ion of ubiquitin origin as the precursor ion. As can be seen from FIG. 12, the product ions which should result from the dissociation were barely detected. On the other hand, FIG. 13 shows an MS/MS spectrum acquired by performing dissociation by a HAD method in which the 13+ ion of ubiquitin origin generated from a sample component by electrospray ionization (ESI) was used as the precursor ion. Various kinds of product ions which are useful for structural analyses are clearly recognizable in FIG. 13. These results demonstrate that the HAD method has a low level of dissociation efficiency for precursor ions whose numbers of charges are low.

As just described, an MS/MS analysis which employs any of the HAD, ETD and ECD methods has a low level of dissociation efficiency if the number of charges of the precursor ion is low. Therefore, the precursor ion should preferably have a high number of charges. However, in general, the number of charges of an ion depends on various factors, such as the type of ionization method as well as the basicity and mass value of the sample. It is often the case that only ions whose numbers of charges are as low as one, two or so can be generated. In particular, in the case where a pretreatment is performed, such as a digestion method using trypsin for cutting the peptide bond at the N-terminal of a basic amino acid residue (arginine or lysine), it is difficult to generate multiply charged ions since the basicity of the sample is low. Furthermore, only singly charged ions can normally be obtained by some specific ionization methods, such as the matrix assisted laser desorption/ionization (MALDI). Accordingly, the use of a HAD, ETD or ECD method for dissociating ions will significantly restrict the methods which can be used for pretreating and ionizing samples.

Regarding those ion dissociation methods, a technique for improving the dissociation efficiency for ions having low numbers of charges has conventionally been known in which the internal energy of a precursor ion is increased by making this ion collide with gas or by irradiating the ion with infrared laser light (see Non-Patent Literature 2). However, such a technique requires a difficult control of the applied energy and may possibly allow the internal energy of the precursor ion to be excessively high and cause a loss of necessary information for the structural analysis, such as the detachment of a post-translational modification.

FIGS. 14A, 14B and 14C are MS/MS spectra acquired by performing the dissociation by a HAD method in which a singly charged peptide ion was used as the precursor ion. The results shown in those drawings were each obtained by irradiating the ion inside an ion trap with infrared laser light introduced from the outside during the HAD reaction, with the output of the infrared laser light set at a 10% lower level than the optimum laser intensity in the case of FIG. 14A, at the optimum laser intensity in the case of FIG. 14B, and at a 10% higher level than the optimum laser intensity in the case of FIG. 14C. As shown in FIG. 14B, useful product ions for the structural analysis were clearly observed when the laser intensity was at the optimum level. By comparison, the intensities of the useful product ions were considerably low when the laser intensity was set at the lower level (see FIG. 14A). Setting the laser intensity at the higher level (see FIG. 14C) yields a significant number of peaks derived from additional product ions which do not contribute to the structural analysis.

Those results demonstrate that even a small amount of increase or decrease from the optimum value of the energy externally applied to the precursor ion noticeably lowers the dissociation efficiency. Optimizing the amount of applied energy in the middle of the measurement is difficult since the optimum value of the applied energy depends on the amino acid sequence of the peptide, pressure of the buffer gas introduced into the ion trap, and other related factors.

CITATION LIST

Patent Literature

Patent Literature 1: WO 2015/133259 A
Patent Literature 2: US 2008/0035841 A
Patent Literature 3: US 2017/0221694 A Non Patent Literature Non Patent Literature 1: H. Takahashi and six other authors, "Hydrogen Attachment/Abstraction Dissociation (HAD) of Gas-Phase Peptide Ions for Tandem Mass Spectrometry", *Analytical chemistry*, 2016, Vol. 88, No. 7, pp. 3810-3816

Non Patent Literature 2: R. A. Zubarev and seven other authors, "Electron capture dissociation for structural characterization of multiply charged protein cations", *Analytical chemistry*, 2000, Vol. 72, No. 3, pp. 563-573

Non Patent Literature 3: B. A. Budnik and another author, "MH 2+ ion production from protonated polypeptides by electron impact: observation and determination of ionization energies and a cross-section", *Chemical Physics Letters*, 2000, Vol. 316, No. 1, pp. 19-23

Non Patent Literature 4: Y. M. Eva Fung and two other authors, "Electron ionization dissociation of singly and multiply charged peptides", *Journal of the American Chemical Society*, 2009, Vol. 131, No. 29, pp. 9977-9985

Non Patent Literature 5: Donald Rapp and two other authors, "Cross Sections for Dissociative Ionization of Molecules by Electron Impact", *Journal of Chemical Physics*, 1965, Vol. 42, p. 4081

Non Patent Literature 6: K. Breuker and four other authors, "Detailed unfolding and folding of gaseous ubiquitin ions characterized by electron capture dissociation", *Journal of the American Chemical Society*, 2002, Vol. 124, No. 22, pp. 6407-6420

Non Patent Literature 7: Cs Koncz and another author, "Calculated cross sections for the single ionization of fullerenes by electron impact", *Nuclear Instruments and Methods in Physics Research Section B*, 1997, Vol. 124, No. 2, pp. 435-437

Non Patent Literature 8: Luciano H. Di Stefano and two other authors, "Size-Dependent Hydrogen Atom Attachment to Gas-Phase Hydrogen-Deficient Polypeptide Radical Cations", *Journal of the American Chemical Society*, 2018, Vol. 140, No. 2, pp. 531-533, DOI: 10.1021/jacs.7b10318

SUMMARY OF INVENTION

Technical Problem

The present invention has been developed to solve the previously described problem. Its primary objective is to provide an ion analyzer and ion dissociation method by which a high level of dissociation efficiency can be achieved in the ion dissociation process even when the number of charges of the precursor ion derived from the target component of the sample is low.

Another objective of the present invention is to provide an ion analyzer and ion dissociation method which does not only improve the efficiency of the dissociation of the precursor ion but also enables appropriate acquisition of information that is important for estimating the structures of biopolymer compounds, such as proteins or peptides.

Solution to Problem

One solution to the previously described problem is to trap the precursor ion derived from the target component of the sample within the ion analyzer and increase the number of charges of the ion so as to improve the efficiency of the dissociation of the precursor ion. In a conventionally known technique for increasing the number of charges of an ion, the ion is irradiated with electrons to increase its number of charges by a mechanism which is similar to electron ionization method. According to Non-Patent Literature 3 or 4, an increase in the number of charges of a precursor ion can be achieved by capturing the ion within a magnetic confinement FT-ICR ion trap and irradiating the ion with electrons having an energy of several ten eV. However, the increase in the number of charges achieved by that technique is as small as one or two, and the percentage of the increase in the number of charges is no higher than several percent. The present inventors have considered that there are two major causes of those results, as will be hereinafter described.

(1) An ion whose number of charges has been increased by electron irradiation normally possesses an excessive amount of energy, while the stabilization of the internal energy of the ion (cooling) through the collision with gas hardly occurs in the FT-ICR cell, since the gas pressure within the cell is extremely low ($1 \times 10^{-5}$ Pa or lower). Accordingly, a considerable portion of the precursor ions irradiated with the electrons are fragmented due to their excessive internal energy before their numbers of charges are increased to high numbers. Thus, it is difficult for the precursor ions to exist as ions having a high number of charges.

(2) An FT-ICR cell which employs magnetic confinement has a low virtual potential within the trap. Therefore, if a high-energy electron collides with a precursor ion, the energy level of the ion may easily exceed the virtual potential and cause the same ion to escape from the ion trap.

The present inventors have noticed the fact that the previously described factors which prevent the number of charges of the precursor ion from being effectively increased by electron irradiation do not pose serious problems in the case of a quadrupole ion trap which uses an electric field for the confinement: Firstly, in a normal type of quadrupole ion trap, cooling gas is introduced into the ion trap to cool the captured ions. Therefore, the gas pressure within the ion trap will not be as low as in the FT-ICR cell, and ions whose internal energy has been increased will be cooled within a short period of time. Secondly, the virtual potential of a normal type of quadrupole ion trap is considerably higher than that of a magnetic confinement FT-ICR cell, so that it is unlikely that an ion which has undergone the electron irradiation escapes from the trap. Based on those findings, the present inventors have conceived the idea of incorporating the technique of increasing the number of charges by electron irradiation into an electric confinement ion trap, and have experimentally confirmed the effect of the idea. Thus, the present invention has been completed.

That is to say, an ion analyzer according to the first aspect of the present invention developed for solving the previously described problem is an ion analyzer in which an ion derived from a sample component is dissociated within an ion trap, and product ions generated by dissociation are analyzed, the ion analyzer including:

a) a quadrupole ion trap configured to capture an ion derived from a sample component, by an effect of a radio-frequency electric field;

b) an electron irradiator configured to inject an electron having an energy equal to or higher than 30 eV to a target ion captured for dissociation within the ion trap; and c) a dissociation promoter configured to dissociate an ion interacted with the electron injected by the electron irradiator.

An ion dissociation method according to the first aspect of the present invention developed for solving the previously described problem is an ion dissociation method for dissociating an ion derived from a sample component and captured within an ion trap.

Specifically, the method includes the steps of: irradiating a target ion captured for dissociation within a quadrupole ion trap by an effect of a radio-frequency electric field, with an electron having an energy equal to or higher than 30 eV; and dissociating an ion interacted with the electron by a predetermined method simultaneously with or immediately after the irradiation with the electron.

In the ion analyzer and ion dissociation method according to the first aspect of the present invention, the technique for analyzing the ions generated by dissociation, i.e., product ions, is not specifically limited. That is to say, the "ion analyzer" according to the present invention includes mass spectrometers for performing a mass spectrometric analysis of the product ions, ion mobility meters for analyzing the ion mobility of the product ions, and other types of ion analyzers.

The ion trap may be a three-dimensional quadrupole ion trap formed by a ring electrode and a pair of endcap electrodes, or a quadrupole linear ion trap including four rod electrodes. The use of a three-dimensional quadrupole ion trap is preferable in that it allows for an easy capturing of ions within a limited space, and it also allows for an easy control of the period of time of the electron irradiation since ions are maintained in the captured state within the aforementioned space while being irradiated with electrons.

In the ion analyzer and ion dissociation method according to the present invention, a precursor ion captured within the quadrupole ion trap by the effect of the radio-frequency electric field is irradiated with electrons having an appropriate amount of energy equal to or higher than 30 eV injected by the electron irradiator. The electron irradiation increases the internal energy of the precursor ion as well as the number of charges of the ion. According to Non-Patent Literature 5, in the case of electron ionization method, the ionization efficiency can be sharply increased by injecting electrons having an energy equal to or higher than 30 eV. This technique can also be applied in the present invention; i.e. irradiating a precursor ion with an electron having an energy equal to or higher than 30 eV can significantly increase the number of charges of the precursor ion and thereby improve the efficiency of the dissociation of the precursor ion.

For example, if the HAD method is used as the ion dissociation method, the precursor ion whose number of charges or amount of internal energy has been increased through an interaction with electrons is irradiated with a flow of hydrogen radicals supplied from the dissociation promoter at a predetermined flow rate, whereby the dissociation of the precursor ion is promoted. As noted earlier, changing the precursor ion into a multiply charged ion having a higher number of charges improves the efficiency of the dissociation by various dissociation methods, including the HAD method. Even if the increase in the number of charges of the precursor ion is insufficient, the internal energy of the precursor ion can be increased through the irradiation with the electrons, allowing the dissociation to more easily occur than when there is no such increase in the internal energy due to the electron irradiation. Consequently, the product ions which are useful for the structural analysis of the sample component will be more easily observed.

In the ion analyzer and ion dissociation method according to the present invention, the technique for the ion dissociation performed by the dissociation promoter is typically a radical-induced dissociation method, such as a HAD, ECD or ETD method.

In the case where the ECD method is used as the ion dissociation method, the dissociation promoter promotes the dissociation of the precursor ion by irradiating the ion with electrons. The amount of energy of those electrons injected for promoting the dissociation by the ECD method is no higher than approximately 1 eV, which is completely different from the amount of energy of the electrons injected by the electron irradiator (equal to or higher than 30 eV). However, those processes are identical in that they use electrons. Accordingly, the electron irradiator, which is provided for the electron irradiation of the ions captured within the ion trap, may be configured to supply electrons with a controllable energy and be operated so that electrons with a comparatively high level of energy are initially introduced into the ion trap to increase the number of charges of the precursor ion, and electrons with a comparatively low level of energy are subsequently injected to promote the dissociation of the precursor ion by the HAD method.

As noted earlier, when the sample to be analyzed is a protein, peptide or similar biopolymer compound, the use of a radical-induced dissociation method, such as the ECD method, makes it possible to acquire useful information for the structural analysis, such as the c/z-type fragment ions as well as the peptide fragments which retain glycans or other modifiers.

The fact that increasing the number of charges of the precursor ion improves the dissociation efficiency holds true for not only the radical-induced dissociation methods but also for many other dissociation methods, such as the CID, IRMPD and UVPD. Accordingly, any of these dissociation methods may also be used as the technique for the ion dissociation performed by the dissociation promoter. In particular, using the collision induced dissociation method for dissociating ions in the dissociation promoter makes the device simpler in configuration since the method does not require optical systems that are necessary in the IRMPD or UVPD method.

As compared to a magnetic confinement ion trap, an electric confinement ion trap has a higher virtual potential against ions and a higher level of ion-confining effect. However, its confining effect on electrons is comparatively low. Therefore, simply introducing electrons from the electron irradiator into the ion trap may allow the introduced electrons to be partially wasted, making it difficult to sufficiently increase the electron density within the ion trap. A low electron density within the ion trap means few opportunities for the ions to come in contact with the electrons. This tends to lower the efficiency of the increase in the number of charges of the ion or increase in the internal energy of the ion.

Accordingly, in the ion analyzer and ion dissociation method according to the first aspect of the present invention, while primary electrons introduced into the ion trap are made to directly act on an ion and promote the increase in the number of charges of the ion or the increase in the internal energy of the ion, the primary electrons may additionally be made to hit the inner surfaces of the electrodes forming the ion trap to irradiate the precursor ion with secondary electrons emitted from the inner surfaces of those electrodes in response to the primary electrons. By this technique, the electron density within the ion trap can be sufficiently increased for a vapor-phase reaction with the precursor ion.

Although the ions captured within the ion trap are oscillating, the ions are most likely to be present within an area around the center of the ion trap. Accordingly, in the case of using the primary electrons for the reaction with the ions, it is preferable to inject the electrons so that the electrons converge into a central area of the ion trap. This increases the opportunities for the electrons to come in contact with the ions even if the amount of electrons introduced into the ion trap is comparatively small.

In the ion analyzer and ion dissociation method according to the first aspect of the present invention, when the primary electrons are made to directly act on the ion in the previously described manner, those electrons should not have an unnecessarily large amount of energy for a reason which will be described later. The amount of energy of the electrons should preferably be roughly equal to or higher than 30 eV, with the upper limit being approximately equal to or lower than 200 eV, or more preferably, equal to or lower than 100 eV. In other words, the energy of the electrons should preferably be set within a range from 30 to 100 eV. In the case of using the secondary electrons for the reaction, the amount of energy of the primary electrons should preferably be equal to or higher than 100 eV, or more preferably, 125 eV in order to achieve a sufficient increase in the number of charges according to an experimental study by the present inventors as well as common knowledge concerning the secondary electron emission coefficient. The upper limit should be 10 keV, at which the secondary electron emission coefficient is lower than 1 for many kinds of metal, or preferably 5 keV, or more preferably 3 keV, or even more preferably 2 keV.

If an electron having such a high amount of energy were made to directly collide with the precursor ion, the internal energy of the ion might be excessively increased, and the ion might be immediately fragmented due to the excessive amount of energy, so that a precursor ion with a high number of charges would not be obtained. Furthermore, the ion hit by the high-energy electron might be accidentally ejected from the ion trap if the virtual potential generated for capturing ions were not sufficiently high.

Those situations will not occur in the electric confinement ion trap: Firstly, a precursor ion whose internal energy has been temporarily increased to an excessively high level will quickly lose its energy by coming in contact with the cooling gas (normally, inert gas) which is introduced into the ion trap in order to cool the ions confined by the electric field. Therefore, the previously mentioned fragmentation due to the excessive amount of energy will not easily occur, and the irradiation with the electrons will more easily lead to an increase in the number of charges of the ion. Secondly, as noted earlier, the electric confinement ion trap has a considerably high level of virtual potential against ions as compared to the magnetic confinement ion trap, so that an ion hit by a high-energy electron can be assuredly captured within the ion trap. Thus, the decrease in the number of precursor ions can be avoided.

In order to prevent the ion from possessing an excessive amount of internal energy in the previously described manner, a predetermined kind of gas should preferably be introduced into the ion trap so that the gas pressure within the ion trap is equal to or higher than approximately $1 \times 10^{-3}$ Pa in the ion analyzer and ion dissociation method according to the present invention. By this method, an ion which has gained an excessive amount of internal energy due to the contact with an electron can be promptly cooled.

In a normal type of quadrupole ion trap, a sinusoidal high voltage with a predetermined frequency is applied to the electrodes forming the ion trap when ions are captured. In that case, the intensity of the radio-frequency electric field for capturing the ions continuously changes with the passage of time, so that the potential energy of the confined ions or the condition of the generation of the secondary electrons will also continuously change with the passage of time. Consequently, the optimum potential condition for the efficiency of the generation of the secondary electrons or the efficiency of the reaction of increasing the number of charges of the ions cannot be constantly maintained. In some cases, the increase in the number of charges of the ion or the increase in the internal energy may be unstable even when the electrons are injected with the same amount of energy.

Accordingly, in order to create an electric field for capturing ions within the ion trap in the ion analyzer and ion dissociation method according to the present invention, it is preferable to additionally provide a voltage generator configured to apply a rectangular radio-frequency voltage to the electrodes forming the ion trap, or in other words, to use a digitally driven ion trap as the ion trap (see Patent Literature 2).

According to this configuration, since the voltage applied to the electrodes forming the ion trap is in a binary form, the potential energy of the captured ion also takes binary values. The condition of the generation of the secondary electrons emitted from the electrodes also changes in a binary way. Therefore, the optimum potential condition for the efficiency of the generation of the secondary electrons or the efficiency of the reaction of in creasing the number of charges of the ion is almost constantly maintained for a predetermined period of time. This enables the dissociation of the precursor ion to be performed under the condition that the number of charges of the precursor ion or the amount of internal energy of the precursor ion is increased in a stable manner.

As another possible configuration, a sinusoidal voltage may be used as the voltage applied to the electrodes forming the ion trap in order to capture ions, and a radio-frequency voltage may be applied to the electron irradiator in such a manner the potential difference between the electrodes forming the ion trap and the electron irradiator forms a rectangular wave. Such a configuration also produces a similar effect to the one obtained by using a digitally driven ion trap in the previously described manner.

The ion analyzer according to the present invention may further include a hydrogen radical supplier configured to introduce hydrogen radicals into the ion trap during or after the electron irradiation by the electron irradiator. It should be noted that hydrogen radicals can also be generated, for example, by irradiating hydrogen gas with electrons. Accordingly, the hydrogen radical supplier is not limited to a device which directly supplies hydrogen radicals into the ion trap; it may also be a device which supplies hydrogen gas into the ion trap and changes the gas into radicals by electron irradiation. If a device which emits thermions generated from a high-temperature filament is used as the electron irradiator, hydrogen radicals will be generated from the hydrogen gas introduced into the ion trap or in the vicinity of the ion trap when this gas exits from the ion trap and comes in contact with the high-temperature tungsten filament. Accordingly, the hydrogen radical supplier may be a device which generates hydrogen radicals by supplying hydrogen gas into the ion trap or in the vicinity of the ion trap and making the hydrogen gas come in contact with a filament.

According to a study by the present inventors, an ion whose number of charges has been increased by electron irradiation is in the form of a radical species. In this state, the hydrogen radicals (in the case of the HAD method) or similar particles subsequently supplied for dissociating the ion may attach to the ion and change it into a non-radical species, making the ion stable and difficult to dissociate. This situation can be avoided by introducing hydrogen radicals into the ion trap during or after the electron irradiation; i.e. the ion in the form of the radical species are thereby changed into a non-radical species which can be easily dissociated by the effect of hydrogen radicals or similar particles subsequently supplied for the dissociation. Thus, by the previously described configuration, the dissociation efficiency for the ion can be improved, and a greater amount of product ions can be generated. In the case of injecting hydrogen radicals for the conversion of the ion from a radical species to a non-radical species, hydrogen radicals of 2000° C. or lower in temperature should preferably be injected for a reason which will be described later.

If the ion analyzer having the previously described configuration is configured as a mass spectrometer for performing mass spectrometry of product ions generated within the ion trap, the dissociation promoter may be configured to dissociate an ion by collision induced dissociation, and the mass spectrometer may be configured to acquire a product ion spectrum when hydrogen radicals are introduced into the ion trap as well as a product ion spectrum when no hydrogen radical is introduced into the ion trap, and to analyze a component in a sample using the product ion spectra.

The type of product ions which occur in a product ion spectrum when hydrogen radicals are introduced into the in trap is different from that of the product ions which occur in a product ion spectrum when no hydrogen radical is introduced. Therefore, according to the previously described configuration, it is possible to obtain information concerning various kinds of product ions which reflect the structure of a sample component, and particularly, the structure of a peptide which has undergone post-translational modification. Such information enables the structural analysis to be easily performed with a high level of accuracy.

In the first aspect of the present invention, the precursor ion is irradiated with electrons injected by the electron irradiator to increase the number of charges of the ion, and the ion is subsequently dissociated by the dissociation promoter. It is also possible to dissociate the ion without using the dissociation promoter. That is to say, the ion having the increased number of charges and the higher amount of internal energy can be directly dissociated by an action of electrons. Such a technique in which ions are dissociated by an effect produced by irradiation with high-energy electrons is called the "electron-induced dissociation" (EID) method (for example, see Patent Literature 3).

The dissociation of a precursor ion by the EID method is similar to the ionization of a sample component by the electron ionization (EI) method used in gas chromatographs or similar devices in that the dissociation is induced by irradiation with high-energy electrons. Based on this fact, the present inventors considered that the ions generated by the EID method should be similar to those generated by the EI method. The EID method can efficiently dissociate ions regardless of the number of charges of the precursor ion. Furthermore, the EID method can generate a group of ions similar to those generated by the EI method, regardless of the type of ion source, since the EID method is a technique for dissociating an ion (precursor ion) generated from a sample component by an ion source and not a technique for ionizing a sample component.

The EI method has a longer history of practical use than the other ionization methods (ESI or MALDI). Libraries which contain mass spectrum data that will be acquired by mass spectrometric analyses of ions derived from various kinds of compounds already exist for the EI and have been widely used for analyses of sample components using gas chromatograph mass spectrometers or similar devices. Those libraries can also be used for mass spectrum data acquired by a mass spectrometric analysis of an ion generated by the EID method. By comparing the acquired data with the extensive libraries created for analyses using gas chromatograph mass spectrometers or similar devices, an exhaustive structural analysis can be performed for proteins, peptides or similar compounds derived from biological samples that cannot be easily ionized without using a specific type of ion source, such as a MALDI ion source.

Thus, an ion analyzer according to the second aspect of the present invention developed for solving the previously described problem is an ion analyzer in which an ion derived from a sample component is dissociated within an ion trap, and product ions generated by dissociation are analyzed, the ion analyzer including:

a) a quadrupole ion trap configured to capture an ion derived from a sample component, by an effect of a radio-frequency electric field;

b) an electron irradiator configured to inject an electron having an energy equal to or higher than 30 eV to a target ion captured for dissociation within the ion trap;

c) a mass spectrometry section configured to acquire mass spectrum data by performing a mass spectrometric analysis on an ion obtained through the dissociation induced by irradiation with the electron;

d) a library containing mass spectrum data to be acquired for a plurality of known compounds by mass spectrometric analyses of ions generated by electron ionization method; and e) a mass spectrum data checker configured to check the matching between the mass spectrum data acquired in the mass spectrometry section and the mass spectrum data of the known compounds contained in the library.

The mass spectrum data contained in the library may be mass spectrum data acquired by performing a mass spectrometric analysis in which each of the known compounds is actually ionized by electron ionization, or they may be mass spectrum data obtained by simulation or similar methods.

The ion trap in the ion analyzer according to the second aspect of the present invention may also be a three-dimensional quadrupole ion trap formed by a ring electrode and a pair of endcap electrodes, or a quadrupole linear ion trap including four rod electrodes. The use of a three-dimensional quadrupole ion trap is preferable in that it allows for an easy capturing of ions within a limited space, and it also allows for an easy control of the period of time of the electron irradiation since ions are maintained in the captured state within the aforementioned space while being irradiated with electrons.

Some of the previously described preferable modes of the ion analyzer according to the first aspect of the present invention are similarly beneficial for the ion analyzer according to the second aspect of the present invention. For example, while primary electrons introduced into the ion trap are made to directly act on an ion and promote the increase in the number of charges of the ion or the increase in the internal energy of the ion, the primary electrons may additionally be made to hit the inner surfaces of the electrodes forming the ion trap to irradiate the precursor ion with secondary electrons emitted from the inner surfaces of those electrodes in response to the primary electrons. The electrons may be injected so that the electrons converge into a central area of the ion trap. A digitally driven ion trap may be used.

Advantageous Effects of Invention

By the ion analyzer and ion dissociation method according to the first aspect of the present invention as well as the ion analyzer according to the second aspect of the present invention, even if the precursor ion derived from the target component of the sample and captured for dissociation within the ion trap has a low number of charges, a high level of dissociation efficiency can be achieved by increasing the number of charges of the ion or the amount of internal energy of the ion. By applying such a technique in a mass spectrometer for performing a mass spectrometric analysis on product ions generated by dissociation, information on the useful product ions for the structural analysis of the sample component can be sufficiently collected, and an accurate structural analysis can be performed.

If the HAD, ECD, ETD or similar method is specifically used as the dissociation method in the ion analyzer or ion dissociation method according to the first aspect of the present invention, important information on the product ions for estimating the structures of proteins, peptides or other biopolymer compounds can be obtained with a high level of sensitivity. Thus, an exhaustive structural analysis of such biopolymer compounds can be carried out satisfactorily.

By the ion analyzer according to the second aspect of the present invention, an exhaustive structural analysis can be performed by referring to a library containing mass spectrum data for various kinds of known compounds even when the target compound is a protein, peptide or similar biopolymer compound that cannot be easily ionized without using a specific type of ion source, such as a MALDI ion source.

BRIEF DESCRIPTION OF DRAWINGS

FIG. 1 is a schematic configuration diagram of an ion trap time-of-flight mass spectrometer according to the first embodiment of the present invention.

FIG. 2 is a model diagram illustrating the mechanism of an increase in electron density.

FIG. 3A is a mass spectrum acquired by performing a mass spectrometric analysis without the ion dissociation after a singly charged ion of ubiquitin origin captured within an ion trap was isolated as the precursor ion, and FIG. 3B is a mass spectrum acquired by performing a mass spectrometric analysis after carrying out the electron irradiation on the singly charged ion of ubiquitin origin isolated as the precursor ion.

FIG. 4 is a chart showing the result of an experiment in which the relationship between the energy of the electrons and the percentage of the increase in the number of charges of the ion was investigated in the case where singly charged ions derived from fullerene (C60) and Substance P were each irradiated with electrons.

FIG. 5A is an MS/MS spectrum acquired by performing a mass spectrometric analysis after dissociating a singly charged peptide ion by a HAD method without electron irradiation, and FIG. 5B is an MS/MS spectrum acquired by performing a mass spectrometric analysis after dissociating the same ion by the HAD method while simultaneously irradiating the ion with electrons.

FIG. 6 is a chart showing the result of a comparison between the signal intensity of a singly charged c7 ion derived from a peptide with electron irradiation and that of the same ion derived without the electron irradiation.

FIG. 9 is a mass spectrum acquired for a precursor ion whose number of charges was increased by electron irradiation, and an enlarged view showing the isotope distribution in the mass spectrum.

FIG. 10A is an isotope distribution of a precursor ion whose number of charges was increased by electron irradiation, and FIG. 10B is an isotope distribution of the precursor ion in the case where high-temperature hydrogen radicals were introduced into the ion trap after the number of charges of the precursor ion had been increased by electron irradiation.

FIGS. 14A, 14B and 14C are MS/MS spectra acquired by performing the dissociation by a HAD method in which a singly charged peptide ion was used as the precursor ion, where the intensity of the laser used for irradiating the ion to increase the amount of energy of the ion was varied.

DESCRIPTION OF EMBODIMENTS

First Embodiment

Figure 7:
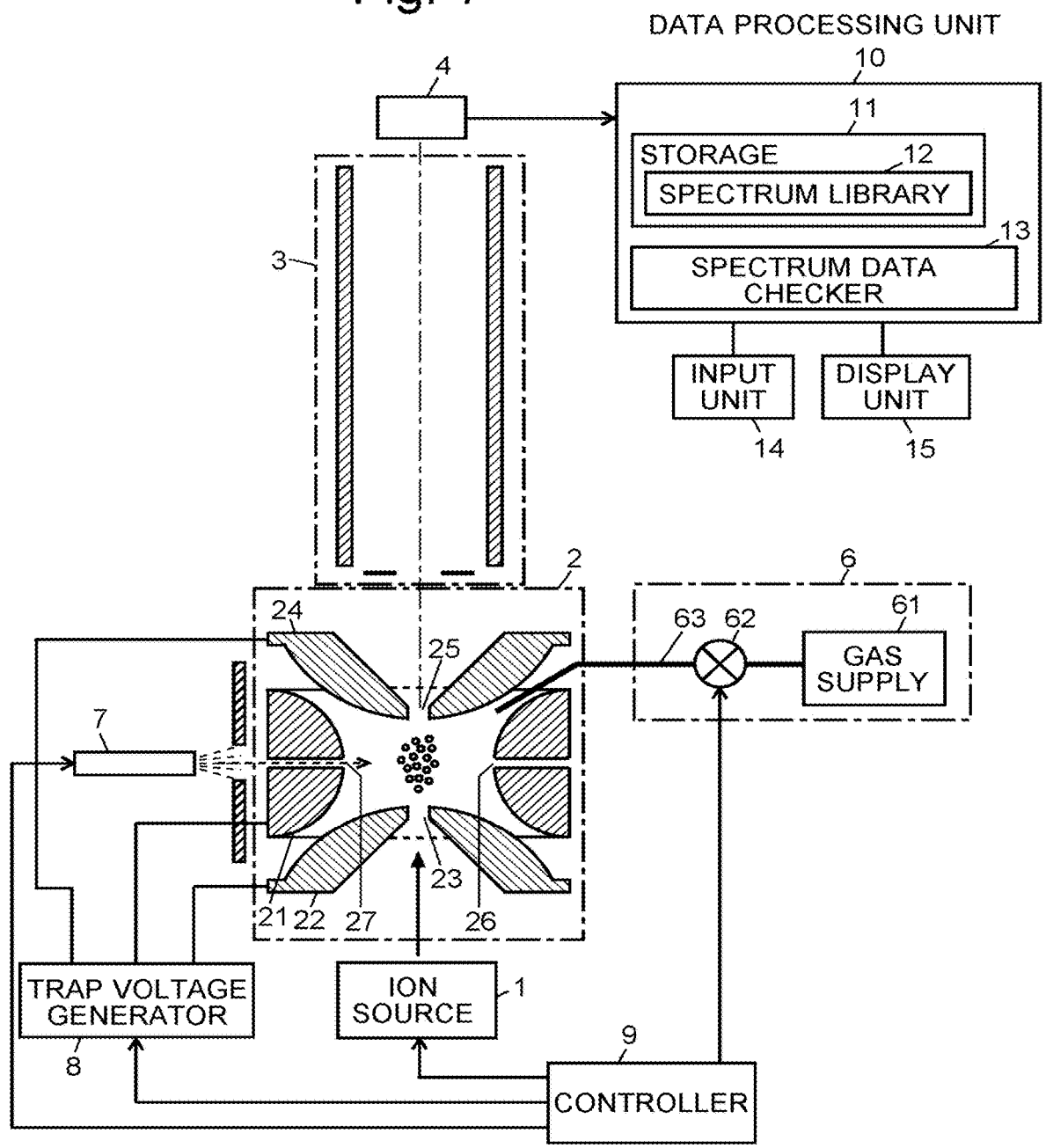
FIG. 7 is a schematic configuration diagram of an ion trap time-of-flight mass spectrometer according to the second embodiment of the present invention.

The configuration and operation of an ion trap time-of-flight mass spectrometer as the first embodiment of the present invention are hereinafter described with reference to the attached drawings.

FIG. 1 is a schematic configuration diagram of the ion trap time-of-flight mass spectrometer according to the present embodiment.

The mass spectrometer according to the present embodiment has the following components contained in a vacuum chamber (not shown) maintained in a vacuum state: an ion source 1 for ionizing a component in a target sample; an ion trap 2 for capturing ions generated by the ion source 1 by the effect of a radio-frequency electric field; a time-of-flight mass separator 3 for separating the ions ejected from the ion trap 2 according to their mass-to-charge ratios m/z; and an ion detector 4 for detecting the separated ions. The mass spectrometer according to the present embodiment further includes: a hydrogen radical irradiator 5 for introducing hydrogen radicals into the ion trap 2 so as to dissociate the captured ions within the ion trap 2 by a hydrogen-attachment dissociation (HAD) method; a gas supplier 6 for supplying a predetermined kind of gas into the ion trap 2; an electron irradiator 7 for injecting electrons into the ion trap 2; a trap voltage generator 8; a controller 9; and a data processing unit 10.

Though not shown, the ion source 1 is a MALDI ion source, which ionizes components in a sample by irradiating the sample with laser light. The ion trap 2 is a three-dimensional quadrupole ion trap including an annular ring electrode 21 as well as a pair of endcap electrodes 22 and 24 facing each other across the ring electrode 21. To each of those electrodes 21, 22 and 24, the trap voltage generator 8 applies a radio-frequency voltage, a direct-current voltage, or a voltage composed of the radio-frequency and direct-current voltages at a predetermined timing according to an instruction from the controller 9. The time-of-flight mass separator 3 in the present example is a linear time-of-flight mass separator, which may be replaced by a different type of device, such as a reflectron type or multi-turn type. The use of a time-of-flight mass separator is not essential. For example, the ion-separation capability of the ion trap 2 itself may be used for the mass separation. An orbitrap may also be used.

The hydrogen radical irradiator 5 includes a hydrogen gas supply source 51, a valve 52 with an adjustable flow rate, a nozzle 53 for ejecting hydrogen gas, a filament (tungsten filament) 55 placed between the tip of the nozzle 53 and the inlet port of the skimmer 54, as well as a skimmer 54 having an opening on the central axis of the stream of gas from the nozzle 53 to extract a thin stream of hydrogen radicals from the diffused gas containing hydrogen molecules and other particles. The gas supplier 6 includes: a gas supply source 61 containing helium, argon or similar gas to be used as buffer gas, cooling gas or other kinds of gas; a valve 62 with an adjustable flow rate; and a gas introduction tube 63. The electron irradiator 7, which includes an electron gun and other elements, is capable of introducing an electron stream with a regulated amount of energy into the ion trap 2. The trap voltage generator 8 does not use a sinusoidal voltage but a rectangular voltage as the radio-frequency voltage. The reason for this choice will be described later in detail.

A brief description of the basic analyzing operation in the mass spectrometer according to the present invention is as follows:

Various ions (most of which are singly charged ions) are generated from a sample, such as a peptide mixture, in the ion source 1. Those ions are ejected from the ion source 1 in a packet-like form and introduced into the ion trap 2 through an ion introduction hole 23 formed in the entrance endcap electrode 22. The peptide-derived ions introduced into the ion trap 2 are captured by a radio-frequency electric field created within the ion trap 2 by the radio-frequency high voltage applied from the trap voltage generator 8 to the ring electrode 21. Subsequently, predetermined voltages are applied from the trap voltage generator 8 to the ring electrode 21 and other electrodes, whereby the ions included within mass-to-charge-ratio ranges exclusive of the target ion having a specific mass-to-charge ratio are excited and eventually removed from the ion trap 2. Thus, a precursor ion having a specific mass-to-charge ratio is selectively captured within the ion trap 2.

The valve 62 in the gas supplier 6 is subsequently opened to introduce the cooling gas into the ion trap 2. The precursor ion is cooled by this gas and gathered into an area around the center of the ion trap 2. In this state, the controller 9 opens the valve 52 in the hydrogen radical irradiator 5 to eject the hydrogen gas from the nozzle 53. Electric current is supplied from a power source (not shown) to the filament 55 located in front of the ejected flow of the gas, to heat the filament 55 to a high temperature. The flow of the hydrogen gas is blown at this filament 55, whereby hydrogen radicals are generated. A portion of the gas, including the hydrogen gas which has not turned into radicals at the filament 55, is removed by the skimmer 54, while hydrogen radicals which have passed through the opening of the skimmer 54 form a thin beam and pass through a radical particle introduction port 26 bored through the ring electrode 21. Those hydrogen radicals are thus introduced into the ion trap 2, and the precursor ion captured within the ion trap 2 is irradiated with those hydrogen radicals.

The opening of the valve 52 and other related parameters are previously adjusted so that the flow rate of the hydrogen radicals injected for irradiating the ion will be equal to or higher than a predetermined level. The period of time of the irradiation with the hydrogen radicals is also appropriately set beforehand. Under those conditions, the precursor ion undergoes radical-induced dissociation, generating product ions of peptide origin. The various product ions thus generated are captured within the ion trap 2 and cooled through the contact with the cooling gas. A predetermined amount of high direct-current voltage is subsequently applied from the trap voltage generator 8 to the endcap electrodes 22 and 24 at a predetermined timing. The ions captured within the ion trap 2 are thereby given acceleration energy and simultaneously ejected through the ion ejection hole 25 to the outside.

The ions having a specific amount of acceleration energy are introduced into the flight space of the time-of-flight mass separator 3. While flying in the flight space, those ions are separated from each other according to their mass-to-charge ratios. The ion detector 4 sequentially detects the separated ions. The data processing unit 10 receives the detection signals and creates a time-of-flight spectrum in which, for example, the point of ejection of the ions from the ion trap 2 is defined as the point in time of zero. Using mass calibration information prepared beforehand, the data processing unit 10 converts the time-of-flight values into mass-to-charge ratios to create a mass spectrum formed by the product ions. The data processing unit 10 performs predetermined data processing based on the information obtained from this mass spectrum (mass information) as well as other kinds of related information to identify a component (peptide) in the sample.

In the mass spectrometer according to the present embodiment, the precursor ion captured within the ion trap 2 is directly irradiated with hydrogen radicals to dissociate the precursor ion into product ions. Although the ion certainly dissociates due to the irradiation with the hydrogen radicals, the dissociation efficiency will be low if the number of charges of the ion is small. Besides, most of the ions generated by the MALDI method are singly charged ions. In view of those facts, and in order to increase the efficiency of the dissociation by the HAD method and improve the detection sensitivity for the product ions, the mass spectrometer according to the present invention injects electrons having a high amount of energy (30 eV or higher) from the electron irradiator 7 into the ion trap 2 immediately before the dissociation of the ion, so as to increase the number of charges of the ion through the interaction between the electrons and the ion.

The effect of the increase in the number of charges of the ion by the irradiation with electrons is hereinafter described using an experimental result.

FIG. 3A is a mass spectrum acquired by performing a mass spectrometric analysis without the ion dissociation after a singly charged ion of ubiquitin origin captured within an ion trap 2 was isolated as the precursor ion. FIG. 3B is a mass spectrum acquired by performing a mass spectrometric analysis after carrying out the electron irradiation for 500 ms on the same singly charged ion of ubiquitin origin isolated as the precursor ion. Only the singly charged ion is observed in FIG. 3A, whereas ions whose numbers of charges are two to six are observed in FIG. 3B. This result confirms that the number of charges of the ion can be assuredly increased by the electron irradiation.

According to a report in Non-Patent Literature 6, the ECD method can induce sufficient dissociation of the 6+ to 13+ ions of ubiquitin. Since the ECD and HAD methods are practically identical in terms of the mechanism of the ion dissociation, it is possible to expect that the HAD method can also induce sufficient dissociation of the 6+ to 13+ ions. As noted earlier, the number of charges of a singly charged ion increases to a value within a range from two to six through the electron irradiation. Accordingly, a sufficient and satisfactory dissociation can be achieved by the HAD method by irradiating the precursor ion with hydrogen radicals after the ion has been irradiated with electrons or while the ion is being irradiated with electrons.

FIG. 4 is a chart showing the result of an experiment in which the relationship between the electron energy and the percentage of the increase in the number of charges of the ion ($[M+H]^{2+}/[M+H]^{+}$) was investigated in the case where singly charged ions derived from fullerene (C60) and Substance P were each irradiated with electrons. The period of time of the electron irradiation was 500 ms. The collision cross-sections for inducing an increase in the number of charges (electron ionization) of fullerene by electron irradiation are described in Non-Patent Literature 7. It has been known that the percentage peaks out when the electron energy is approximately 50 eV. By comparison, the result shown in FIG. 4 demonstrates that the percentage of the increase in the number of charges peaks out when the electron energy is approximately 500 eV, which is one order of magnitude higher than the previously mentioned value. From this difference in electron energy, it is likely that the reaction which increases the number of charges of the ion is not directly caused by the high-energy electron irradiation but is caused by secondary electrons generated on the inner surfaces of the ring electrode 21 and other electrodes forming the ion trap 2.

As shown in FIG. 2, when an electric conductor, such as the ring electrode 21, is hit by a high-energy primary electron, a larger number of secondary electrons than the primary electron are emitted from the electric conductor. The generation efficiency of the secondary electrons increases with an increase in the energy of the primary electron. The efficiency peaks out when the amount of energy of the primary electron is approximately several hundred eV. From this fact, it is likely that the dependency of the percentage of the increase in the number of charges on the electron energy shown in FIG. 4 corresponds to the efficiency of the generation of the secondary electrons with respect to the amount of energy of the injected electrons. Since the ion trap 2 is an electric confinement ion trap, it is difficult to efficiently confine electrons. However, an increase in the number of charges of the precursor ion can be achieved within a practical reaction time by increasing the density of the electrons in the inner space of the ion trap 2 through the emission of secondary electrons induced by making high-energy primary electrons hit the electrode 21 and other components in the previously described manner. Needless to say, the use of the secondary electrons emitted from the ring electrode 21 and other components is not indispensable; even in the case of directly irradiating the ion with high-energy electrons of 30 eV or higher, an increase in the number of charges of the precursor ion can be achieved within a practical reaction time by increasing the density of the electrons to a certain extent or by converging the electron stream into a central area of the ion trap 2 where the ion is most likely to be present.

In the previously described case where the electrons ejected from the electron irradiator 7 are made to hit the inner surface of the ring electrode 21 or other portions of the ion trap 2 so as to use the thereby generated secondary electrons for the increase in the number of charges of the precursor ion, the energy level of the (primary) electrons injected from the electron irradiator 7 should preferably be set within a range from 30 eV to 2 keV, for example. In order to improve the emission efficiency of the secondary electrons, the electrode may be made of an electrically conductive material having low work function, or the electrode may be coated with an electrically conductive film layer having low work function.

If the internal energy of the precursor ion is excessively increased due to the electron irradiation, the amount of energy should be decreased to avoid unwanted fragmentation. To this end, the supply of the cooling gas may preferably be controlled so that the gas pressure within the ion trap 2 during the electron irradiation process becomes equal to or higher than $1 \times 10^{-3}$ Pa.

The effect of the increase in the number of charges of the ion by electron irradiation also depends on the potential energy possessed by the ion. If the potential energy varies, the effect of the increase in the number of charges will also vary even if the electrons having the same amount of energy are constantly injected, making it difficult to constantly achieve a high level of dissociation efficiency. To address this problem, a rectangular voltage is used as the radio-frequency voltage for capturing ions in the mass spectrometer according to the present invention. This voltage makes a captured ion alternately have two values of the potential energy in a binary way. This prevents the potential energy from continuously varying with the passage of time as in the case where a sinusoidal voltage is used as the radio-frequency voltage. Consequently, even if electrons having the same amount of energy are continuously injected, a sufficiently high effect of the increase in the number of charges can be achieved in a stable manner, and a high level of dissociation efficiency can be achieved.

In the previous description, it is assumed that the number of charges of the precursor ion increases from one to six or so due to the electron irradiation. Even if the number of charges of the precursor ion does not increase (or the amount of increase is rather small), the electron irradiation may increase the amount of internal energy of the precursor ion and improve the breaking efficiency of some of the bonds, with the result that a product ion which cannot be observed without the electron irradiation may become observable. This requires an appropriate control of the amount of energy supplied to the ion, otherwise a loss of useful information for the structural analysis will possibly occur, such as the detachment of a post-translational modification. In the mass spectrometer according to the present invention, the amount of energy of the electrons for irradiating the ion can be accurately controlled through the acceleration voltage used for accelerating the electrons in the electron irradiator 7. Meanwhile, as described earlier, the potential energy of the captured ion will take a binary value due to the application of the rectangular radio-frequency voltage to the ring electrode 21 for capturing the ion. Under such a condition, the increase in the internal energy of the ion through the interaction with the electrons can be stabilized by injecting the electrons with the same amount of energy. Thus, an excessive increase in the internal energy of the ion can be prevented.

The effect of the increase in the intensity of the product ions through the irradiation of an ion with electrons is hereinafter described using experimental results.

FIG. 5A is an MS/MS spectrum acquired by performing a mass spectrometric analysis after dissociating a singly charged peptide ion (Acetyl-DRVYIHPFHLLVYS) within the ion trap 2 by a HAD method without electron irradiation. FIG. 5B is an MS/MS spectrum acquired by performing a mass spectrometric analysis after dissociating the same ion by the HAD method while simultaneously irradiating the ion with electrons (electron injection energy: 500 eV).

As shown in FIG. 5A, some product ions, such as c10, c11 and c12, were observed with sufficient intensities even without electron irradiation. On the other hand, as shown in FIG. 5B, product ions equal to or lower than c7, which could not be observed without electron irradiation, were also observed when the electron irradiation was performed. The $MH^{2+}$ ion, i.e. the precursor ion with the increased number of charges, was also observed when the electron irradiation was performed. The amplitude of the radio-frequency voltage applied to the ring electrode 21 of the ion trap 2 was 1 kV. Therefore, it is possible to suppose that the potential energy of the ion at the center of the ion trap 2 is 500 V, i.e. one half of the amplitude, which means that the amount of energy of the primary electron is also 500 V. Meanwhile, it is commonly known that the optimum amount of electron energy for inducing the reaction which increases the number of charges of the aforementioned peptide ion by electron irradiation is approximately 100 eV (see Non-Patent Literature 4). From those facts, it is likely that the low-energy secondary electrons generated on the surface of the ring electrode 21 and other electrodes forming the ion trap 2 are also involved in the present reaction in addition to the primary electron introduced from the outside. However, it can also be expected that product ions with practically sufficient intensities will still be observed even if the ion is directly irradiated with the electrons without using the secondary electrons.

FIG. 6 shows the result of an experiment in which the aforementioned c7 ion generated with the electron irradiation was compared with that of the same ion generated without the electron irradiation. As can be seen in FIG. 6, the signal intensity of c7 ion generated by the HAD method was increased to approximately 2.5 times due to the electron irradiation. From this result, it is most likely that the interaction between the electrons and the precursor ion increased the internal energy of the ion, and consequently improved the reaction efficiency of the HAD.

In Non-Patent Literature 8, which demonstrates the result of an experiment in which a quadruply charged positive ion of insulin B chain was irradiated with hydrogen radicals after irradiation with electrons, it is reported that the attachment of hydrogen radicals barely occurred. This experimental result contradicts the previously described experimental result obtained in the present embodiment. Although Non-Patent Literature 8 includes no detailed description of the experimental conditions, such as the feed rate of the hydrogen radicals and the hydrogen irradiation, a likely reason why no attachment of hydrogen radicals was recognized is that the amount of the generated hydrogen radicals was insufficient. As described by the present inventors in Patent Literature 1, hydrogen radicals are highly reactive and easily recombine into hydrogen molecules on the inner surface of the tube which guides the hydrogen radicals into the ion trap, on the wall of a chamber, or on other areas. For example, according to an estimation, the hydrogen radicals need to be introduced at a flow rate equal to or higher than $4 \times 10^{10}$ atoms/s or at a density equal to or higher than $3 \times 10^{12}$ atoms/m$^3$ into a space where ions derived from a sample component are present, in order to ensure a sufficient amount of radicals that contribute to the dissociation reaction. It is most likely that the amount of hydrogen radicals in Non-Patent Literature 8 did not satisfy such conditions, so that no attachment of hydrogen radicals was recognized.

Second Embodiment

An ion trap time-of-flight mass spectrometer as the second embodiment of the present invention is hereinafter described with reference to FIGS. 7, 8A and 8B.

FIG. 7 is a schematic configuration diagram of the ion trap time-of-flight mass spectrometer according to the second embodiment. The same components as used in the ion trap time-of-flight mass spectrometer according to the first embodiment shown in FIG. 1 are denoted by the same reference signs. A comparison of FIGS. 1 and 7 shows that the ion trap time-of-flight mass spectrometer according to the second embodiment does not include the hydrogen radical irradiator 5 for performing the ion dissociation by the HAD method. Both the increase in the number of charges and the dissociation of the ion are achieved by an injection of electrons from the electron irradiator 7.

That is to say, in the ion trap time-of-flight mass spectrometer according to the second embodiment, after a precursor ion having a specific mass-to-charge ratio has been selectively captured within the ion trap 2, cooling gas is introduced from the gas supplier 6 into the ion trap 2 to cool the precursor ion. Then, high-energy electrons are injected from the electron irradiator 7 into the ion trap 2 for a predetermined period of time to increase the number of charges of the precursor ion as well as dissociate the same ion by the action of the electrons after the number of charges of the ion has been increased. Such a technique which dissociates a precursor ion by irradiation with high-energy electrons is called the "electron induced dissociation" (FED) method.

The data processing unit 10 in the ion trap time-of-flight mass spectrometer according to the second embodiment includes a storage section 11 in which a spectrum library 12 is stored and a spectrum data checker 13 which is a functional block. An input unit 14 and a display unit 15 are connected to the data processing unit 10. In the spectrum library 12, mass spectrum data to be acquired by a mass spectrometric analysis of an ion generated by electron ionization method are contained for each of a plurality of known compounds.

Figure 8A:
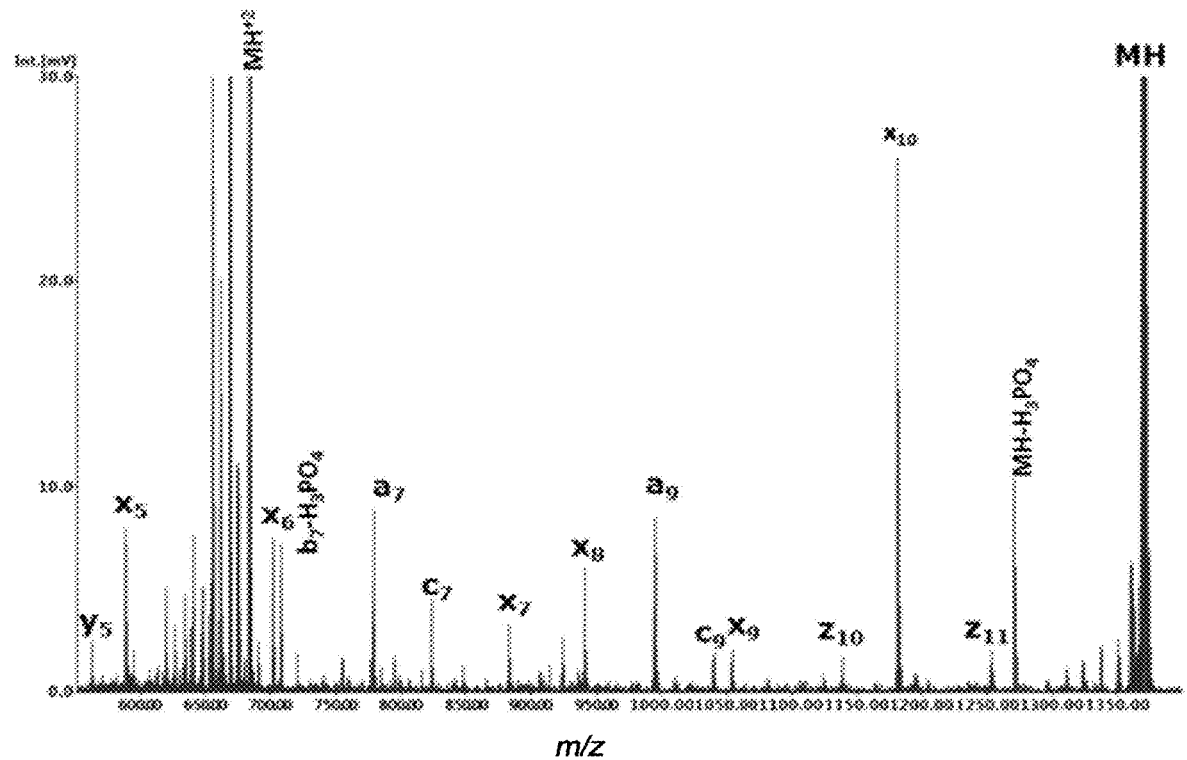
FIG. 8A is an MS/MS spectrum acquired by performing a mass spectrometric analysis on a singly charged phosphate peptide ion after irradiating the ion with electrons.

FIG. 8A is an MS/MS spectrum acquired by performing a mass spectrometric analysis on a singly charged phosphate peptide ion (with threonine phosphorylation at one site: pT) after irradiating the ion with electrons (electron injection energy: 500 eV) for 250 ms within the ion trap 2. As can be seen in FIG. 8A, a doubly charged ion ($MH^{+2}$), i.e. the precursor ion whose number of charges has been increased by a mechanism similar to the electron ionization method, is observed, along with various product ions which are also observed with sufficient intensities. Since those product ions are a/c/x/z-types of ions, it is most likely that radical-induced dissociation occurred, as in the HAD, ETD, ECD or similar method. The majority of the product ions have phosphate bonded to them, which means that the dissociation barely caused detachment of the modifier. As already noted, the amount of energy of the electrons is significantly different from that of the electrons used for the irradiation in an ECD method. Therefore, it is evident that the mechanism of the dissociation is different from that of the dissociation by the ECD method.

The collection efficiency of the product ions has reached an extremely high level, nearly 30%. This value is roughly one order of magnitude higher than the collection efficiency of the product ions reported for a device employing a conventional magnetic confinement FT-ICR ion trap (see Non-Patent Literature 3 or 4). This difference is most likely to be due to the difference in virtual potential between the magnetic confinement FT-ICR ion trap and the digitally driven three-dimensional quadrupole ion trap.

Thus, the ion dissociation which is performed after the number of charges of the precursor ion has been increased can also be achieved by electron irradiation. In that case, both the increase in the number of charges and the dissociation of the ion can be achieved by using only the electron irradiator 7. Therefore, the device structure can be considerably simplified.

Figure 8B:
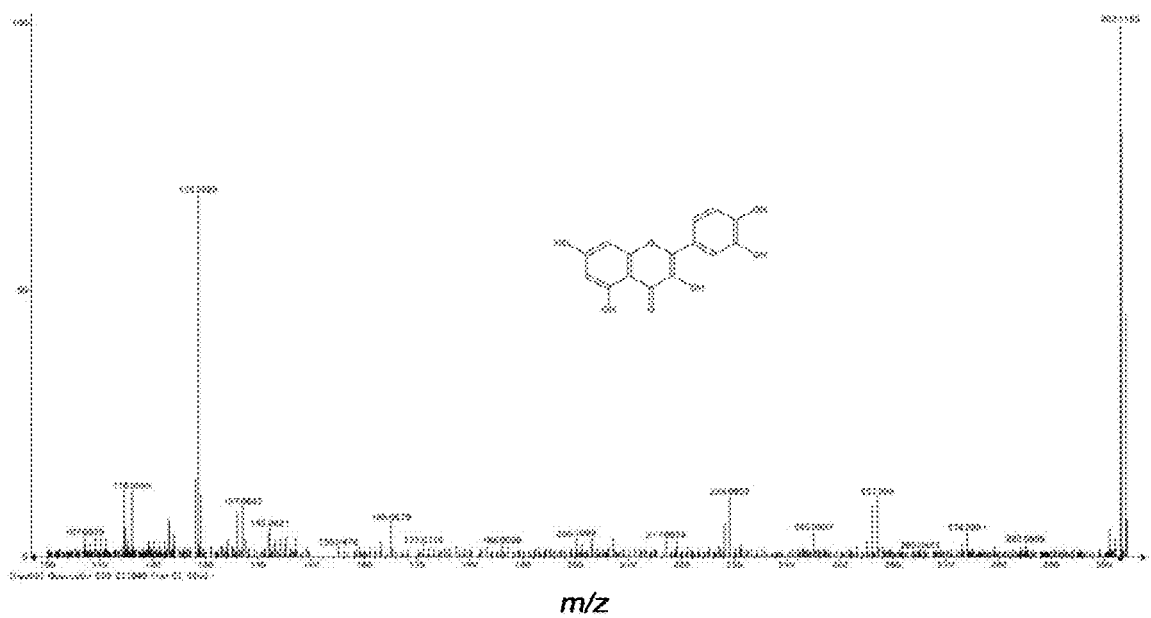
FIG. 8B is an MS/MS spectrum acquired by performing a mass spectrometric analysis after irradiating a singly charged quercetin ion with electrons.

FIG. 8B is an MS/MS spectrum acquired by performing a mass spectrometric analysis for quercetin, which is a monovalent low-molecular compound, after ionizing quercetin by a MALDI method, capturing the ion within an ion trap 2, and irradiating the ion with electrons. As shown in FIG. 8B, many fragment-ion peaks have been detected for not only high-molecular compounds, such as peptide ions, but also low-molecular compounds in the MS/MS spectrum. This demonstrates the effectiveness of the method according to the present embodiment.

In the ion trap time-of-flight mass spectrometer according to the second embodiment, after a mass spectrum as shown in FIG. 8A or 8B has been acquired, the spectrum data checker 13 determines the degree of matching (in terms of the mass-to-charge ratios of the positions of the mass peaks, intensity ratios of the mass peaks, etc.) with each of the mass spectrum data of the known compounds contained in the library 12 stored in the storage section 11. Then, the spectrum data checker 13 selects a predetermined number of compounds in descending order of the degree of matching, and displays the names and mass spectra of those compounds on the display unit 15. When comparing the mass spectrum data acquired by the ion detector 4 and the mass spectrum data of the known compounds contained in the library 12, the spectrum data checker 13 allows for a predetermined range of mass error for the determination on the matching/no-matching of the position (mass-to-charge ratio) of each mass peak. The predetermined range of mass error may be a range of mass error previously stored in the device, or the user may enter and set the range of mass error through the input unit 14 each time.

The dissociation of the precursor ion by the EID method utilizes a mechanism similar to the ionization of a sample component by electron ionization (EI) method which is widely used in gas chromatograph mass spectrometers or similar devices. Therefore, dissociating a precursor ion by an EID method produces a group of ions similar to those generated by an EI method. The EID method can efficiently dissociate ions regardless of the number of charges of the precursor ion. Furthermore, the EID method can efficiently generate similar kinds of ions to those generated by the ET method, regardless of the type of ion source, since the EID method is a technique for fragmenting an ion (precursor ion) generated from a sample component by an ion source and not a technique for directly ionizing a sample component.

Electron ionization method has a long history of practical use. There are libraries for electron ionization method which contain mass spectrum data for a considerable number of known compounds. In the ion trap time-of-flight mass spectrometer according to the second embodiment, mass spectrum data acquired by dissociating an ion generated by ionizing a sample component in the ion source 1 are compared with the mass spectrum data contained in the spectrum library 12. Accordingly, an exhaustive structural analysis can be performed for proteins, peptides or similar compounds derived from biological samples that cannot be easily ionized without using a specific type of ion source, such as a MALDI ion source.

The present inventors have conducted a spectrum-matching test in which an MS/MS spectrum of quercetin shown in FIG. 8B was compared with mass spectra contained in a commercially available spectrum library (MIST 14) prepared for analyses using the electron ionization (EI) method. This library contains mass spectra of flavonoids which are structural isomers of quercetin. Those flavonoids have exactly the same accurate mass as quercetin (302.042653 Da) and merely differ from quercetin in the binding positions of the hydroxyl groups. Despite such a similarity, the correct compound, i.e. quercetin, scored the highest on the spectrum-matching test for the MS/MS spectrum of FIG. 8B. Thus, it was confirmed that a compound can be correctly identified by comparing an MS/MS spectrum acquired by dissociating a precursor ion using an EID method as in the present embodiment, with mass spectra contained in a spectrum library prepared for the EI method.

Any of the previously described embodiments is a mere example and can be appropriately changed or modified in accordance with the spirit of the present invention.

Although the first embodiment was concerned with the case of using a HAD method, it is evident that the previously described effects can be similarly obtained, for example, in the case of using an ECD or ETD method which uses substantially the same mechanism for ion dissociation as the HAD method. There are also other dissociation methods in which the dissociation efficiency normally improves with an increase in the number of charges of the precursor ion, such as the CID, IRMPD or UVPD method. The present invention can naturally be applied in a mass spectrometer including an ion trap which dissociates precursor ions by any of those ion dissociation methods.

In a mass spectrometer according to any of the previously described embodiments, inert gas is normally used as the cooling gas. In the case of the first embodiment, hydrogen gas may also be used as the cooling gas or be mixed in the cooling gas to give an additional effect.

A precursor ion whose number of charges has been increased by electron irradiation is a radial species $[M+nH]^{(n+1)+*}$ and unstable. A study by the present inventors has revealed that, when hydrogen radicals are introduced into an ion trap within which such an unstable precursor ion is captured, a phenomenon occurs in which a hydrogen radical attaches to the precursor ion. As a result, the precursor ion in the form of the radical species is changed into a chemically stable ion of non-radical species, $[M+nH]^{(n+1)+}$. In the case of dissociating ions by a HAD, ETD, ECD or similar method, if an electron or hydrogen radical attaches to a precursor ion which is in the form of a radical species, the precursor ion is contrarily changed into a non-radical species and may be difficult to dissociate.

By comparison, in the previously described case where the precursor ion which has been changed into a radical species due to the increase in the number of charges is temporarily stabilized by the action of the hydrogen radical, the ion is subsequently changed into a radical species due to the action of the electron or hydrogen radical injected for dissociating the ion, so that the dissociation can easily occur. Consequently, the generation efficiency of the product ion improves.

FIG. 9 shows the result of a measurement in which a peptide ion held in the ion trap 2 was irradiated with high-energy electrons in the ion trap time-of-flight mass spectrometer according to the first embodiment. The result shows that a radical ion $[M+H]^{2+*}$ with the increased number of charges was created.

FIG. 10B shows the result of a measurement in which a radical ion $[M+H]^{2+*}$ with an increased number of charges obtained by electron ionization was irradiated with a directional beam of high-temperature hydrogen radicals (2300 K) as described in Patent Literature 1. A comparison with FIG. 10A, which shows the result of a measurement in which only the electron irradiation was performed, demonstrates that the ions are distributed in a complex form due to the attachment and abstraction of hydrogen radicals, as in a normal HAD measurement. In FIG. 10B, non-radical ions and radical ions are mixed together. If such ions are fragmented by a CID or similar process, the resulting fragment peaks will be extremely complex due to the radical-induced dissociation and thermal dissociation, making the spectrum difficult to analyze.

In order to attach a hydrogen radical to a non-radical ion or abstract it from an ion, it is normally necessary to use a high-temperature hydrogen radical as described earlier. However, the present inventors have experimentally discovered that even a low-temperature hydrogen radical can be sufficiently attached if the target is a radical ion.

Figure 11:
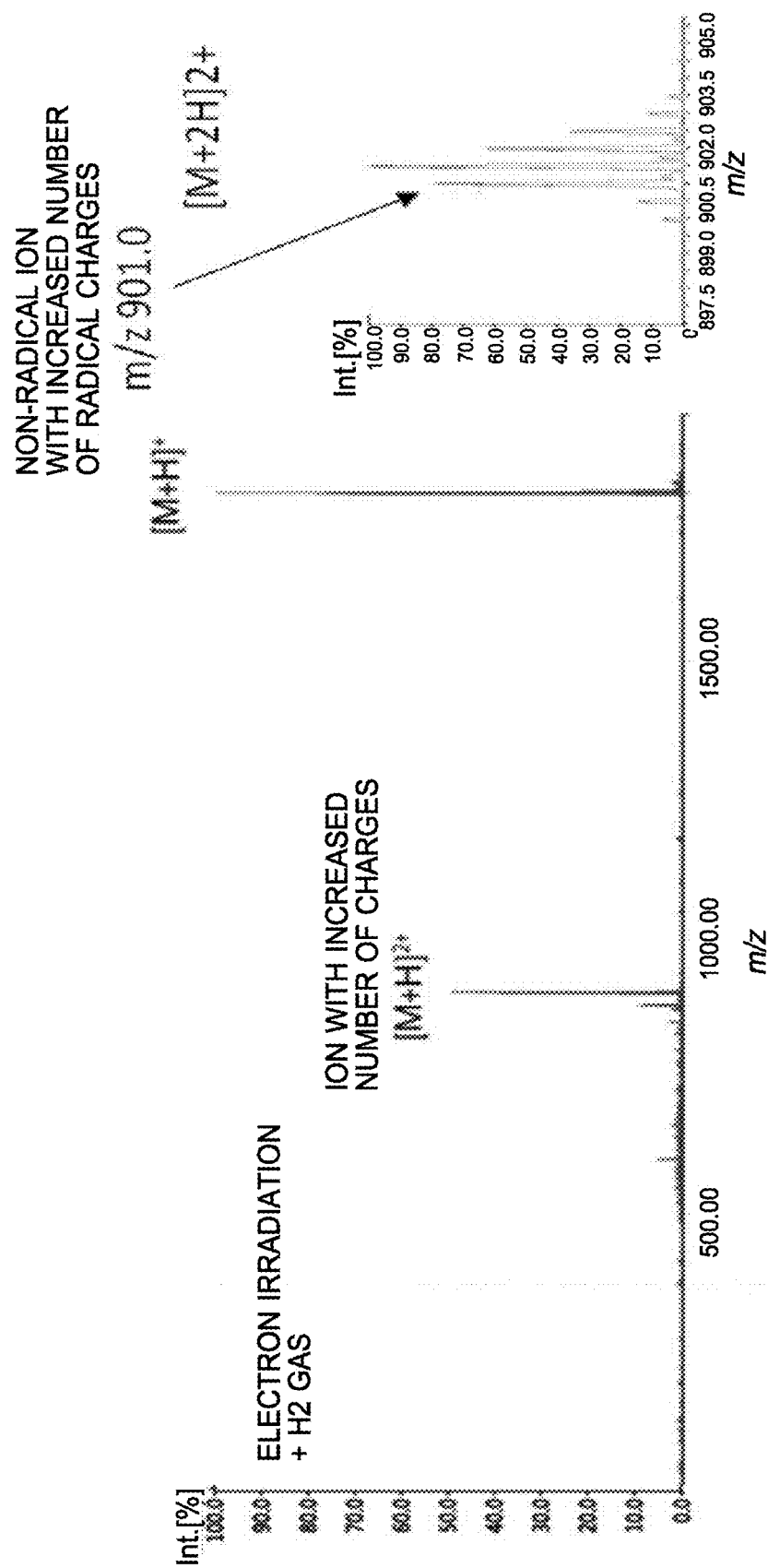
FIG. 11 is a mass spectrum and an enlarged view of the isotope distribution of a precursor ion in the case where low-temperature hydrogen radicals were introduced into the ion trap after the number of charges of the precursor ion had been increased by electron irradiation.
Figure 12:
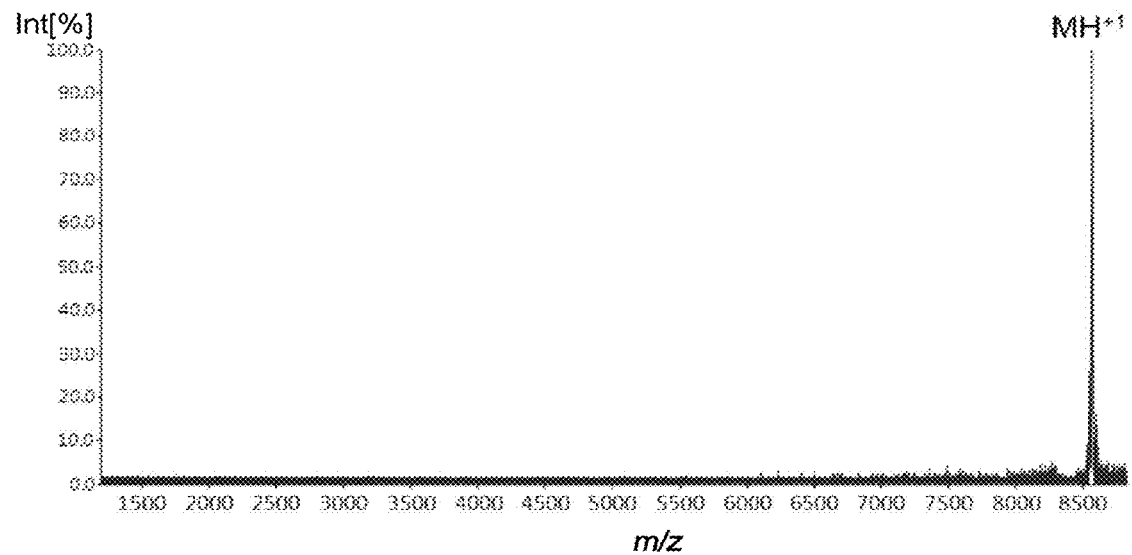
FIG. 12 is an MS/MS spectrum acquired by performing the dissociation by a HAD method using a singly charged ion of ubiquitin origin as the precursor ion.
Figure 13:
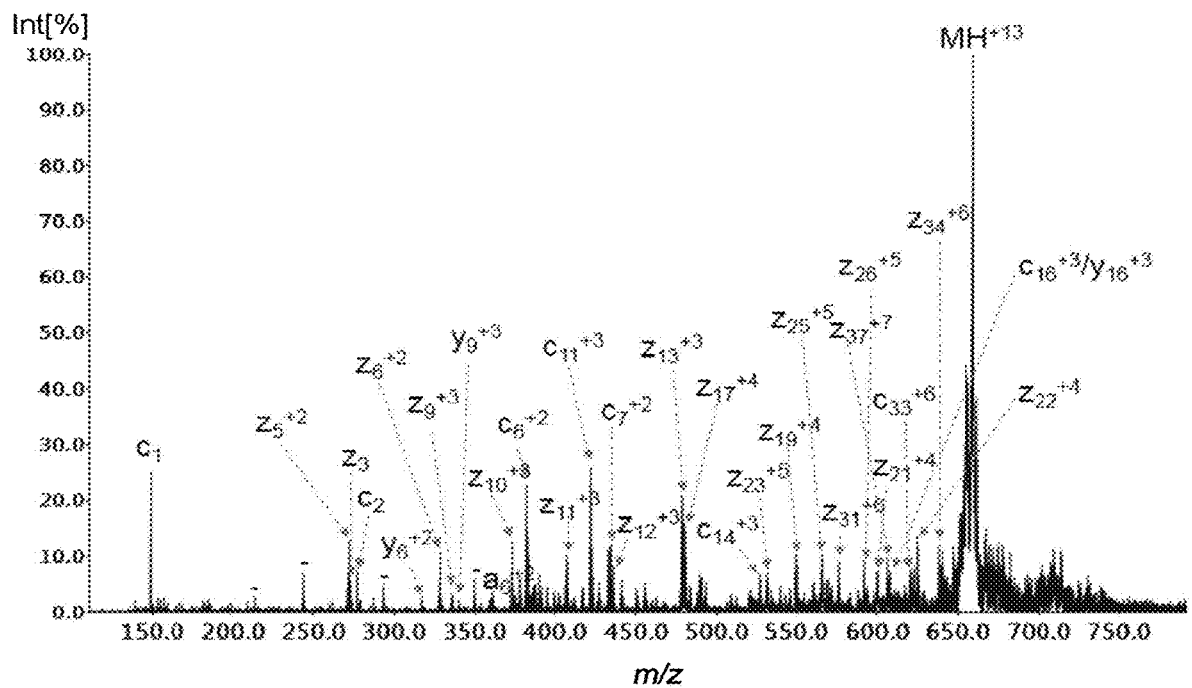
FIG. 13 is an MS/MS spectrum acquired by performing the dissociation by a HAD method in which the 13+ ion of ubiquitin origin generated by electrospray ionization was used as the precursor ion.

FIG. 11 shows the result of a measurement using the ion trap time-of-flight mass spectrometer according to the first embodiment, in which a peptide ion held within the ion trap 2 was irradiated with electrons to obtain a radical ion $[M+H]^{2+*}$ with the increased number of charges, and this ion was subsequently irradiated with a hydrogen radical whose temperature was as low as room temperature. A non-radical ion with the increased number of charges was clearly detected at +1 Da. Thus, a non-radical ion with an increased number of charges can be selectively generated by irradiating an ion with a low-temperature hydrogen radical.

In the measurement, non-directional hydrogen radicals were used for the irradiation in place of a directional beam of high-temperature hydrogen radicals generated by a thermal dissociation source as described in Patent Literature 1. As shown in FIG. 1, the non-directional hydrogen radicals were generated in the vicinity of the surface of the tungsten filament 55 by placing the filament 55 near the ion trap 2 and supplying electric current through the filament 55 to heat it. Such non-directional hydrogen radicals are cooled to approximately room temperature by coming in contact with the wall surface of the ion trap 2 and other areas while being transported to the center of the ion trap 2. The hydrogen radicals can also be cooled by coming in contact with other areas, such as the wall surface of a passage through which those hydrogen radicals are supplied. The temperature of the hydrogen radicals only needs to be lower than the value described in Patent Literature 1 (e.g. equal to or lower than 2000° C.) to obtain a spectrum which can be more easily analyzed than conventional ones.

Another verification test performed by the present inventors has revealed that the temperature of the hydrogen radicals generated by inducing an electric discharge at a high frequency through water vapor or hydrogen gas is lower than that of the hydrogen radicals generated by a thermal dissociation source, and the previously described effect can similarly be obtained by directly irradiation with the radicals generated by the electric discharge. The temperature of the radicals normally decreases with increasing frequency of the electric discharge. Therefore, the hydrogen radicals should preferably be generated by an electric discharge at a frequency equal to or higher than RF frequency, and more preferably, at a frequency equal to or higher than the microwave band. The temperature of the radicals generated by inductively coupled discharge is lower than that of the radicals generated by capacitively coupled discharge. Accordingly, inductively coupled discharge should preferably be used.

As for the configuration in which a CID method is used for the ion dissociation after the number of charges of the precursor ion is increased by irradiating the ion with electrons within the ion trap 2, an analysis may be performed as follows:

If a normal type of inert gas, i.e. inert gas which does not contain $H_2$ gas, is used as the cooling gas, the precursor ion whose number of charges has been increased by electron irradiation will be a radical species, as shown in FIG. 9. If this ion is dissociated by the OD method, a/x- and c/z-types of product ions will be mainly generated. On the other hand, if $H_2$ gas (or inert gas containing $H_2$ gas) is used as the cooling gas, and low-temperature hydrogen radicals generated by changing the $H_2$ gas into radicals by making this gas come in contact with the filament as described earlier (or by other appropriate methods) are introduced into the ion trap 2, the precursor ion whose number of charges has been increased will be a non-radical species, as shown in FIG. 11. If this ion is dissociated by a CID method, the b/y type of product ions will be mainly generated. Thus, the type of product ions obtained by the dissociation changes depending on whether or not the irradiation with hydrogen radicals is performed. Accordingly, it is preferable to acquire both an MS/MS spectrum with hydrogen-radical irradiation and one without hydrogen-radical irradiation, and perform a structural analysis using the two MS/MS spectra in a complementary manner (e.g. by merging them with each other). This increases the kinds of obtained product ions and facilitates the structural analysis of peptides.

Although a MALDI ion source is used in the mass spectrometer according to any of the previously described embodiments, it is naturally possible to use any type of ionization technique. The ion trap may be configured as a linear ion trap in place of the three-dimensional quadrupole ion trap.

Any of the previously described embodiments is a mere example of the present invention, and any change, addition or modification appropriately made within the spirit of the present invention in any aspect other than the already described ones will also evidently fall within the scope of claims of the present application.

REFERENCE SIGNS LIST

1 . . . Ion Source
2 Ion Trap
21 Ring Electrode
22, 24 . . . Endcap Electrode
23 . . . Ion Introduction Hole
25 . . . Ion Ejection Hole
26 . . . Radical Particle Introduction Port
3 Time-of-Flight Mass Separator
4 . . . Ion Detector
5 . . . Hydrogen Radical Irradiator
51 Hydrogen Gas Supplier
52 . . . Valve
53 . . . Nozzle
54 . . . Skimmer
55 . . . Filament
6 . . . Gas Supplier
61 . . . Gas Supply Source
62 . . . Valve
63 . . . Gas Introduction Tube
7 . . . Electron Irradiator
8 . . . Trap Voltage Generator
9 Controller
10 . . . Data Processing Unit

The invention claimed is:

1. An ion analyzer for analyzing product ions generated by dissociation, comprising:
a quadrupole ion trap configured to capture an ion derived from a sample component by an effect of a radio-frequency electric field;
an electron irradiator configured to inject an electron having an energy equal to or higher than 30 eV to a target ion captured for dissociation within the quadrupole ion trap such that a number of charges of the target ion is increased; and
a dissociation promoter configured to dissociate, after irradiation with the electron, an ion interacted with the electron injected by the electron irradiator.

2. The ion analyzer according to claim 1, wherein the dissociation promoter is configured to dissociate an ion by radical-induced dissociation.

3. The ion analyzer according to claim 1, further comprising:
a hydrogen radical supplier configured to introduce hydrogen radicals into the ion trap during or after electron irradiation by the electron irradiator.

4. The ion analyzer according to claim 3, wherein the hydrogen radical supplier is configured to generate hydrogen radicals by microwave discharge.

5. The ion analyzer according to claim 3, wherein the hydrogen radical supplier is configured to generate hydrogen radicals by inductively coupled discharge at a high frequency.

6. The ion analyzer according to claim 3, wherein the ion analyzer cools the hydrogen radicals by making the hydrogen radicals collide with a passage through which the hydrogen radicals are supplied or with a wall surface of the ion trap.

7. The ion analyzer according to claim 3, wherein the temperature of the hydrogen radicals is equal to or lower than 2000° C.

8. The ion analyzer according to claim 1, wherein the dissociation promoter is configured to dissociate an ion by collision induced dissociation.

9. The ion analyzer according to claim 1, further comprising:
a gas supplier configured to introduce a predetermined kind of gas into the ion trap such that a gas pressure within the ion trap is equal to or higher than $1\times10^{-3}$ Pa.

10. The ion analyzer according to claim 1, wherein the ion analyzer is configured as a mass spectrometer for performing mass spectrometry of product ions generated within the ion trap, the dissociation promoter is configured to dissociate an ion by collision induced dissociation, and the mass spectrometer is configured to acquire a product ion spectrum when hydrogen radicals are introduced into the ion trap and a product ion spectrum when no hydrogen radical is introduced into the ion trap, and to analyze a component in a sample using the product ion spectra.

11. An ion analyzer for analyzing product ions generated by dissociation, comprising:
a quadrupole ion trap configured to capture an ion derived from a sample component by an effect of a radio-frequency electric field;
an electron irradiator configured to inject an electron having an energy equal to or higher than 30 eV to a target ion captured for dissociation within the quadrupole ion trap such that a number of charges of the target ion is increased;
a mass spectrometry section configured to acquire mass spectrum data by performing a mass spectrometric analysis on an ion obtained through the dissociation induced by irradiation with the electron;
a library including mass spectrum data to be acquired for a plurality of known compounds by mass spectrometric analyses of ions generated by electron ionization method; and
a mass spectrum data checker configured to check matching between the mass spectrum data acquired in the mass spectrometry section and the mass spectrum data of the known compounds contained in the library.

12. The ion analyzer according to claim 11, wherein the mass spectrum data checker allows for a predetermined range of mass error for determination on the matching/no-matching of a position of a mass peak when comparing the mass spectrum data acquired by the mass spectrometry section and the mass spectrum data of the known compounds contained in the library.

13. The ion analyzer according to claim 1, further comprising:
a voltage generator configured to apply a rectangular radio-frequency voltage to at least one of electrodes forming the ion trap such that an electric field for capturing ions is created within the ion trap.

14. The ion analyzer according to claim 1, further comprising:
a voltage generator configured to apply a radio-frequency voltage to the electron irradiator such that a potential difference between the electron irradiator and one of electrodes forming the ion trap to which a voltage for capturing ions within the ion trap is applied takes a form of a rectangular wave.

15. The ion analyzer according to claim 1, wherein the electron irradiator is configured to irradiate an inner surface of at least one of electrodes forming the ion trap with an electron such that an ion is irradiated with a secondary electron emitted from the inner surface of the electrode in response to the electron.

16. A method for dissociating an ion derived from a sample component and captured within an ion trap, comprising:
irradiating, with an electron, a target ion captured for dissociation within a quadrupole ion trap by an effect of a radio-frequency electric field such that a number of charges of the target ion is increased; and
dissociating an ion interacted with the electron by a predetermined method simultaneously with or immediately after irradiation with the electron.

17. A method for analyzing product ions generated by dissociation, comprising:
capturing, within a quadrupole ion trap, an ion derived from a sample component by an effect of a radio-frequency electric field;
irradiating a target ion captured for dissociation within the quadrupole ion trap with an electron having an energy equal to or higher than 30 eV such that a number of charges of the target ion is increased; and
dissociating an ion interacted with the electron after the irradiating.

18. The ion analyzer according to claim 11, further comprising:
a voltage generator configured to apply a rectangular radio-frequency voltage to at least one of electrodes forming the ion trap such that an electric field for capturing ions is created within the ion trap.

19. The ion analyzer according to claim 11, further comprising:
a voltage generator configured to apply a radio-frequency voltage to the electron irradiator such that a potential difference between the electron irradiator and one of electrodes forming the ion trap to which a voltage for capturing ions within the ion trap is applied takes a form of a rectangular wave.

20. The ion analyzer according to claim 11, wherein the electron irradiator is configured to irradiate an inner surface of at least one of electrodes forming the ion trap with an electron such that an ion is irradiated with a secondary electron emitted from the inner surface of the electrode in response to the electron.

* * * * *